(12) United States Patent
Ichikawa et al.

(10) Patent No.: US 9,067,497 B2
(45) Date of Patent: Jun. 30, 2015

(54) POWER TRANSMITTING DEVICE AND POWER TRANSFER SYSTEM

(71) Applicants: Shinji Ichikawa, Toyota (JP); Toru Nakamura, Toyota (JP)

(72) Inventors: Shinji Ichikawa, Toyota (JP); Toru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/074,160

(22) Filed: Nov. 7, 2013

(65) Prior Publication Data

US 2014/0138199 A1    May 22, 2014

(30) Foreign Application Priority Data

Nov. 21, 2012  (JP) ................................. 2012-255003

(51) Int. Cl.
| | |
|---|---|
| *B60L 5/00* | (2006.01) |
| *H02J 7/02* | (2006.01) |
| *B60L 11/18* | (2006.01) |
| *B60M 7/00* | (2006.01) |

(52) U.S. Cl.
CPC ................. *B60L 5/005* (2013.01); *H02J 7/025* (2013.01); *B60L 11/182* (2013.01); *B60M 7/003* (2013.01); *B60L 11/1824* (2013.01); *B60L 11/1831* (2013.01); *B60L 11/1833* (2013.01); *B60L 11/1846* (2013.01); *B60L 2230/16* (2013.01); *B60L 2240/80* (2013.01); *Y02T 10/7005* (2013.01); *Y02T 90/122* (2013.01); *Y02T 10/7088* (2013.01); *Y02T 90/125* (2013.01); *Y02T 90/163* (2013.01); *Y02T 90/169* (2013.01); *Y02T 90/121* (2013.01); *Y02T 90/14* (2013.01); *Y02T 90/128* (2013.01); *Y04S 30/14* (2013.01)

(58) Field of Classification Search
CPC . B60L 11/182; B60L 11/005; B60L 11/1803; B60L 11/1816; B60L 11/1812; B60L 11/1831; B60L 11/1837; B60L 11/1833; B60L 11/1824; B60L 11/1846; B60L 9/00; B60L 5/005; H02J 5/005; H02J 7/025
USPC ........................................................... 191/10
See application file for complete search history.

(56) References Cited

U.S. PATENT DOCUMENTS

| | | | | |
|---|---|---|---|---|
| 5,573,090 | A | * | 11/1996 | Ross ............................... 191/10 |
| 5,669,470 | A | * | 9/1997 | Ross ............................... 191/10 |

(Continued)

FOREIGN PATENT DOCUMENTS

| | | |
|---|---|---|
| JP | A-2006-166570 | 6/2006 |
| JP | A-2009-284696 | 12/2009 |

(Continued)

*Primary Examiner* — Jason C Smith
(74) *Attorney, Agent, or Firm* — Oliff PLC

(57) ABSTRACT

A power transmitting device that contactlessly transmits electric power to a power receiving device having a secondary coil provided at a vehicle, and a power transfer system, are provided. The power transmitting device includes primary coils, a selecting unit and a control unit. The primary coils are arranged at an interval in an arrangement direction. The selecting unit selects one primary coil to which electric power is supplied from a power supply. The control unit controls the selecting unit by supplying the selected primary coil with a second electric power smaller than a first electric power, selecting a power transmitting coil from among the primary coils on the basis of at least one of a power transmitting situation of the selected primary coil and a power receiving situation of the secondary coil, and supplying the power transmitting coil with the first electric power.

13 Claims, 19 Drawing Sheets

(56) References Cited

U.S. PATENT DOCUMENTS

| | | | |
|---|---|---|---|
| 6,651,566 B2* | 11/2003 | Stephan et al. | 104/288 |
| 8,240,406 B2* | 8/2012 | Stoicoviciu et al. | 180/2.1 |
| 8,292,052 B2* | 10/2012 | Bohori et al. | 191/10 |
| 8,418,823 B2* | 4/2013 | Matsumura | 191/10 |
| 8,827,058 B2* | 9/2014 | Vollenwyder et al. | 191/10 |
| 2005/0178632 A1* | 8/2005 | Ross | 191/10 |
| 2010/0244583 A1* | 9/2010 | Shimokawa | 307/104 |
| 2011/0163542 A1* | 7/2011 | Farkas | 290/2 |
| 2011/0198176 A1* | 8/2011 | Meins et al. | 191/10 |
| 2011/0253495 A1* | 10/2011 | Vollenwyder et al. | 191/10 |
| 2011/0315496 A1* | 12/2011 | Bohori et al. | 191/10 |
| 2012/0103741 A1* | 5/2012 | Suh et al. | 191/10 |
| 2012/0186927 A1* | 7/2012 | Suh et al. | 191/10 |
| 2013/0037365 A1* | 2/2013 | Ichikawa | 191/10 |
| 2013/0098723 A1* | 4/2013 | Cho et al. | 191/10 |
| 2013/0233663 A1* | 9/2013 | Czainski et al. | 191/10 |
| 2014/0015312 A1* | 1/2014 | Niizuma | 307/9.1 |
| 2014/0138199 A1* | 5/2014 | Ichikawa et al. | 191/10 |
| 2014/0151175 A1* | 6/2014 | Vietzke | 191/10 |
| 2014/0174870 A1* | 6/2014 | Niizuma | 191/10 |
| 2014/0217966 A1* | 8/2014 | Schneider et al. | 320/108 |
| 2014/0225434 A1* | 8/2014 | Niizuma | 307/10.1 |
| 2014/0238804 A1* | 8/2014 | Vietzke et al. | 191/10 |
| 2014/0292266 A1* | 10/2014 | Eger et al. | 320/108 |

FOREIGN PATENT DOCUMENTS

| | | |
|---|---|---|
| JP | A-2010-093902 | 4/2010 |
| JP | A-2010-172084 | 8/2010 |
| JP | A-2010-239777 | 10/2010 |
| JP | A-2010-268661 | 11/2010 |
| JP | A-2011-167031 | 8/2011 |
| JP | A-2012-200032 | 10/2012 |

* cited by examiner

FIG. 2
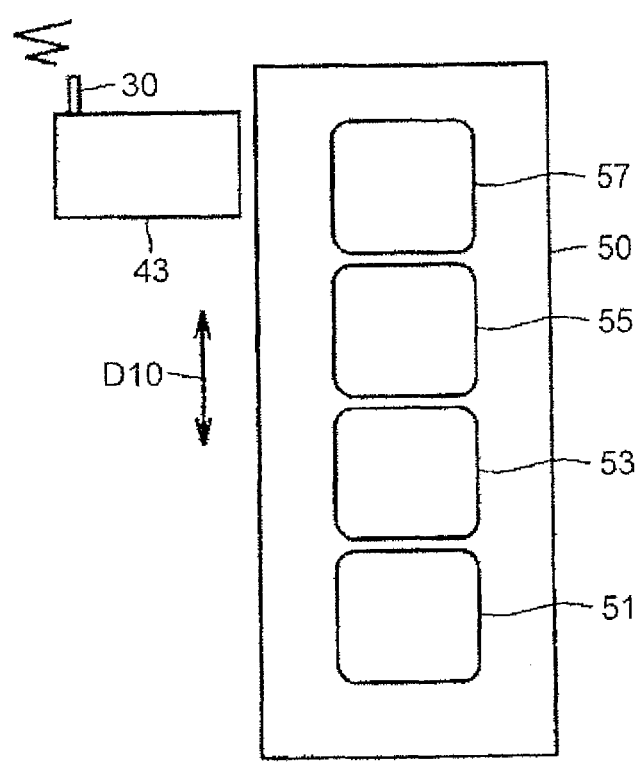
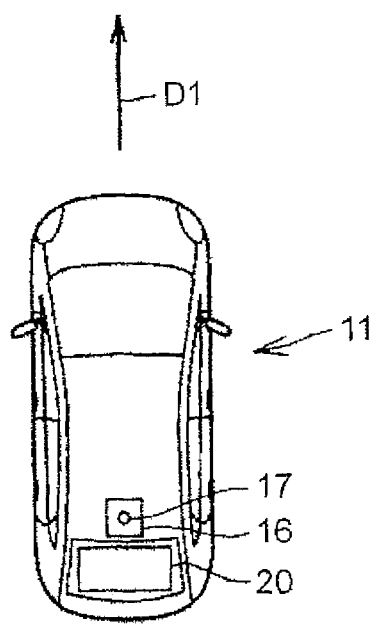

POWER TRANSMITTING DEVICE AND POWER TRANSFER SYSTEM

INCORPORATION BY REFERENCE

The disclosure of Japanese Patent Application No. 2012-255003 filed on Nov. 21, 2012 including the specification, drawings and abstract is incorporated herein by reference in its entirety.

BACKGROUND OF THE INVENTION

1. Field of the Invention

The invention relates to a power transmitting device and a power transfer system.

2. Description of Related Art

As is described in Japanese Patent Application Publication No. 2010-172084 (JP 2010-172084 A) and Japanese Patent Application Publication No. 2010-239777 (JP 2010-239777 A), there is known a contactless power supply system that contactlessly transmits electric power.

In recent years, a road-to-vehicle power supply system in which a plurality of power transmitting devices are embedded in a road surface and a power receiving device provided at a vehicle contactlessly receives electric power from any one of the power transmitting devices has become a focus of attention.

For example, a road-to-vehicle power supply system described in Japanese Patent Application Publication No. 2006-166570 (JP 2006-166570 A) includes power receiving-side communication means for transmitting information, such as positional information, toward a power transmitting device, a power receiving antenna, the power transmitting device, power transmitting antennas and power transmitting-side communication means. The power transmitting device causes some of the power transmitting antennas to irradiate microwaves on the basis of the received information.

Generally, when a vehicle receives electric power in a charging space, the vehicle initially approaches the charging space and stops, and then receives electric power.

Here, the road-to-vehicle power supply system described in JP 2006-166570 A includes the plurality of power transmitting-side communication means, and causes some of the power transmitting antennas to irradiate microwaves on the basis of the position of one of the power transmitting-side communication means, which has received the information from the power receiving-side communication means.

In other words, it is indispensable that the above-described road-to-vehicle power supply system includes the plurality of power transmitting-side communication means. Therefore, the power transmitting device becomes very expensive. However, if the number of power transmitting-side communication means is reduced, there occurs a positional deviation between the power receiving antenna and the power transmitting antennas, with the result that power transfer efficiency decreases.

SUMMARY OF THE INVENTION

The invention provides a power transmitting device and a power transfer system that are able to obtain high power transfer efficiency at the time when a vehicle approaches a location at which a plurality of primary coils are provided, then stops and receives electric power in a stopped state, and are able to reduce manufacturing cost.

An aspect of the invention provides a power transmitting device that contactlessly transmits electric power to a secondary coil provided at a vehicle. The power transmitting device includes a plurality of primary coils, a selecting unit and a control unit. The plurality of primary coils are arranged at an interval in an arrangement direction. The selecting unit is configured to select one of the primary coils, to which electric power is supplied from a power supply. The control unit is configured to control the selecting unit. The control unit is configured to cause the power supply to supply the selected primary coil with a second electric power smaller than a first electric power, select a power transmitting coil from among the plurality of primary coils on the basis of at least one of a power transmitting situation of the selected primary coil and a power receiving situation of the secondary coil, and cause the power supply to supply the power transmitting coil with the first electric power.

In the power transmitting device, the control unit may be configured to detect an approach direction of the vehicle. The control unit may be configured to start control for selecting the power transmitting coil before the secondary coil passes through over one of the plurality of primary coils, which is located at an upstream end in the approach direction. The control unit may be configured to select the one of the plurality of primary coils, which is located at the upstream end in the approach direction, at the time when control for selecting the power transmitting coil is started and change a selecting one of the primary coils with movement of the secondary coils.

In the power transmitting device, the control unit may be configured to detect the approach direction of the vehicle on the basis of information received from the vehicle. In addition, in the power transmitting device, the plurality of primary coils may include a first end coil and a second end coil, the first end coil being located at one end in the arrangement direction, and the second end coil being located at the other end in the arrangement direction. The control unit may be configured to alternately select the first end coil and the second end coil and detect the approach direction of the vehicle on the basis of a result of comparison between a power receiving efficiency of the secondary coil from the first end coil and a power receiving efficiency of the secondary coil from the second end coil.

In the power transmitting device, the power receiving situation may be a power receiving efficiency of the secondary coil. The control unit may be configured to select one of the primary coils, which is adjacent in the approach direction with respect to the selected primary coil, when the power receiving efficiency of the secondary coil from the selected primary coil becomes lower than a first threshold.

In the power transmitting device, the plurality of primary coils may include a center coil located at a center in the arrangement direction. The control unit may be configured to select the center coil at the time when control for selecting the power transmitting coil is started and select one of the primary coils on the basis of a position of the secondary coil after the center coil has been selected.

In the power transmitting device, the control unit may be configured to set a selecting direction from the center coil toward the secondary coil on the basis of information input from the vehicle. The control unit may be configured to detect a first power receiving efficiency at the time when the second electric power is supplied to the selected primary coil. The control unit may be configured to detect a second power receiving efficiency at the time when the second electric power is supplied to an adjacent coil adjacent in the selecting direction with respect to the selected primary coil. The control unit may be configured to set the selected primary coil as the power transmitting coil when the first power receiving efficiency is higher than the second power receiving efficiency and the first power receiving efficiency is higher than a second threshold.

In the power transmitting device, the control unit may be configured to, when the control unit determines that a power transmitting condition is not satisfied after the first electric power is supplied to the power transmitting coil, stop supply of electric power to the power transmitting coil and select one of the primary coils other than the power transmitting coil as a power transmitting coil.

The power transmitting device may further include a temperature measuring unit configured to detect a temperature of each of the primary coils. The control unit may be configured to determine that the power transmitting condition is not satisfied when the temperature of the power transmitting coil exceeds a third threshold.

In the power transmitting device, the control unit may be configured to supply the second electric power to one of the primary coils, adjacent in the arrangement direction with respect to the power transmitting coil. The control unit may be configured to, when a power receiving efficiency of the secondary coil at the time when the second electric power is supplied to the one of the primary coils, adjacent in the arrangement direction, is higher than a fourth threshold, select the adjacent primary coil as the power transmitting coil.

The power transmitting device may further include a detecting unit configured to detect a distance between the selected primary coil and the secondary coil. The control unit may be configured to determine that the power transmitting condition is not satisfied when the control unit determines that the distance between the selected primary coil and the secondary coil is larger or smaller than a predetermined range on the basis of an output from the detecting unit.

In the power transmitting device, the control unit may be configured to, when a power receiving efficiency of the secondary coil from one of the primary coils, adjacent with respect to the selected primary coil, is higher than or equal to a predetermined value, select the one of the primary coils, adjacent with respect to the selected primary coil, as a second selected coil.

Another aspect of the invention provides a power transfer system including a power receiving device that has a secondary coil provided at a vehicle and a power transmitting device that contactlessly transmits electric power to the secondary coil. The power transfer system includes a plurality of primary coils, a selecting unit and a control unit. The plurality of primary coils are arranged at an interval in an arrangement direction. The selecting unit is configured to select one of the primary coils, to which electric power is supplied from a power supply. The control unit is configured to control the selecting unit. The control unit is configured to cause the power supply to supply the selected primary coil with a second electric power smaller than a first electric power, select a power transmitting coil from among the plurality of primary coils on the basis of at least one of a power transmitting situation of the selected primary coil and a power receiving situation of the secondary coil, and cause the power supply to supply the power transmitting coil with the first electric power.

With the power transmitting device and the power transfer system according to the aspects of the invention, it is possible to achieve high-efficiency power transfer and to reduce cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a plan view that schematically shows a power transmitting device and a vehicle according to the first embodiment of the invention;

DETAILED DESCRIPTION OF EMBODIMENTS

Figure 1:
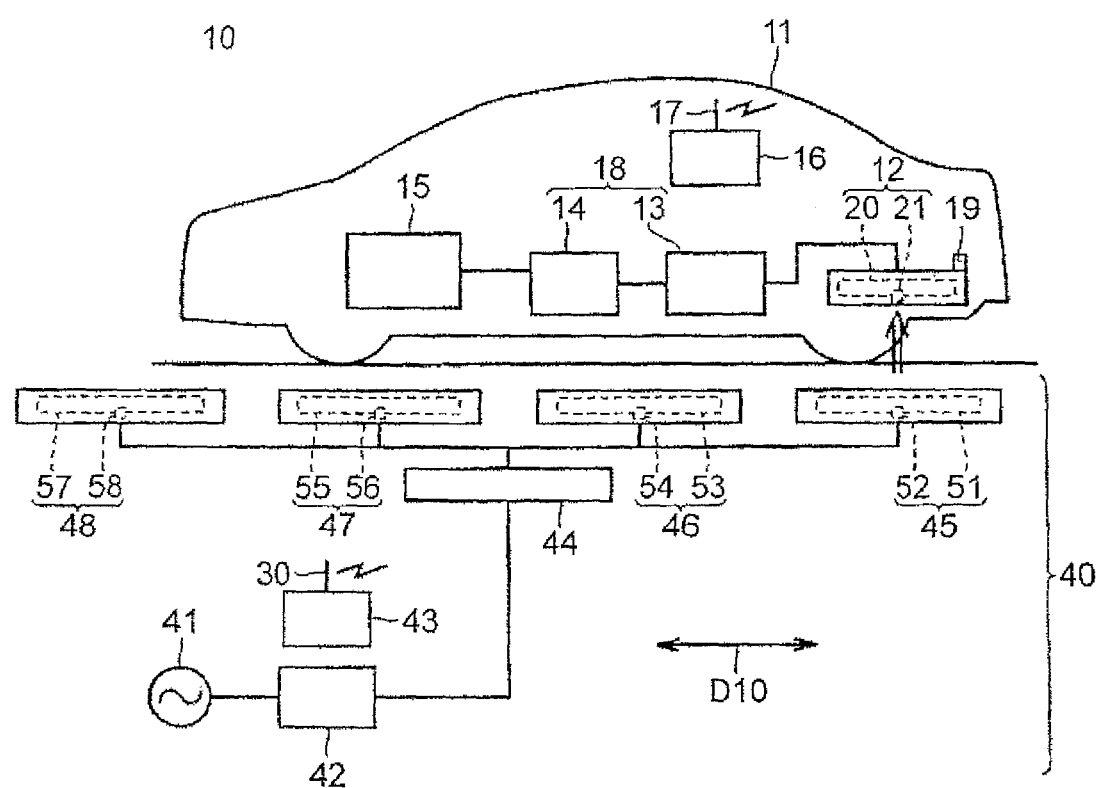
FIG. 1 is an overall block diagram that shows an example of a contactless power transfer system according to a first embodiment of the invention.

Hereinafter, embodiments of the invention will be described in detail with reference to the accompanying drawings. Like reference numerals denote the same or corresponding components in the drawings, and the description thereof is not repeated. A first embodiment will be described first. FIG. 1 is an overall block diagram that shows an example of a contactless power transfer system. A vehicle 11 is illustrated as an electric vehicle that uses a rotary electric machine as a drive source; however, as long as the vehicle 11 contactlessly receives electric power, the vehicle 11 may be another automobile or a power receiving object may not be a vehicle.

As shown in FIG. 1, a contactless power transfer system 10 includes a power transmitting device 40 and the vehicle 11. The power transmitting device 40 includes a communication unit 30, a power supply unit 42, a power transmitting-side control unit 43, a selecting unit 44 and a plurality of power transmitting units 45, 46, 47, 48.

The vehicle 11 includes a power receiving unit 12, a rectifier 13, an electrical storage device 14, a power generating device 15, a vehicle-side control unit 16, a communication unit 17 and a voltmeter 19. The electrical storage device 14 and the rectifier 13 constitute a charging module 18.

The power receiving unit 12 includes a secondary coil 20 and a capacitor 21. The secondary coil 20 and the capacitor 21 cooperatively constitute a resonant circuit.

The rectifier 13 converts alternating-current power, received from the power receiving unit 12, to direct-current power, and outputs the converted direct-current power to the electrical storage device 14, thus charging the electrical storage device 14. The electrical storage device 14 stores not only electric power that is output from the rectifier 13 but also electric power that is generated by the power generating device 15. The electrical storage device 14 supplies the stored electric power to the power generating device 15. A large-capacitance capacitor may also be employed as the electrical storage device 14. The voltmeter 19 measures the voltage of the secondary coil 20.

The power generating device 15 generates driving force for propelling the vehicle 11 using electric power stored in the electrical storage device 14. Although not specifically shown in FIG. 1, the power generating device 15, for example, includes an inverter, a motor, drive wheels, and the like. The inverter receives electric power from the electrical storage device 14. The motor is driven by the inverter. The drive wheels are driven by the motor. The power generating device 15 may include a generator for charging the electrical storage device 14 and an engine that is able to drive the generator. The communication unit 17 transmits information about the power receiving efficiency of the secondary coil 20, and the like, to the power transmitting device 40.

The power supply unit 42 generates high-frequency alternating-current power upon reception of electric power from a power supply 41. The power supply 41 may be a commercial power supply or may be an independent power supply device.

The power transmitting unit 45 includes a primary coil 51 and a capacitor 52. The primary coil 51 and the capacitor 52 cooperatively constitute a resonant circuit. The power transmitting unit 46 includes a primary coil 53 and a capacitor 54. The primary coil 53 and the capacitor 54 cooperatively constitute a resonant circuit. The power transmitting unit 47 includes a primary coil 55 and a capacitor 56. The primary coil 55 and the capacitor 56 constitute a resonant circuit. The power transmitting unit 48 includes a primary coil 57 and a capacitor 58. The primary coil 57 and the capacitor 58 constitute a resonant circuit.

The power transmitting units 45, 46, 47, 48 are arranged at intervals in an arrangement direction D10. The primary coils 51, 53, 55, 57 are also arranged at intervals in the arrangement direction D10.

The selecting unit 44 supplies a selected one of the primary coils 51, 53, 55, 57 with electric power from the power supply unit 42 (power supply 41). The power transmitting-side control unit 43 controls the power supply unit 42 and the selecting unit 44. The communication unit 30 exchanges information with the communication unit 17 provided at the vehicle 11.

FIG. 2 is a plan view that schematically shows the power transmitting device 40 and the vehicle 11. As shown in FIG. 2, a parking lot 50 that indicates a parking position of the vehicle 11 is provided on a ground surface.

When the parking lot 50 and the primary coils 51, 53, 55, 57 are viewed from above, the primary coils 51, 53, 55, 57 are located within the parking lot 50.

In the state shown in FIG. 2, the vehicle 11 is distanced from the parking lot 50, and is traveling in an approach direction D1.

In the example shown in FIG. 2, the approach direction D1 is the forward traveling direction of the vehicle 11; however, the vehicle 11 may travel backward in the approach direction D1.

Figure 3:
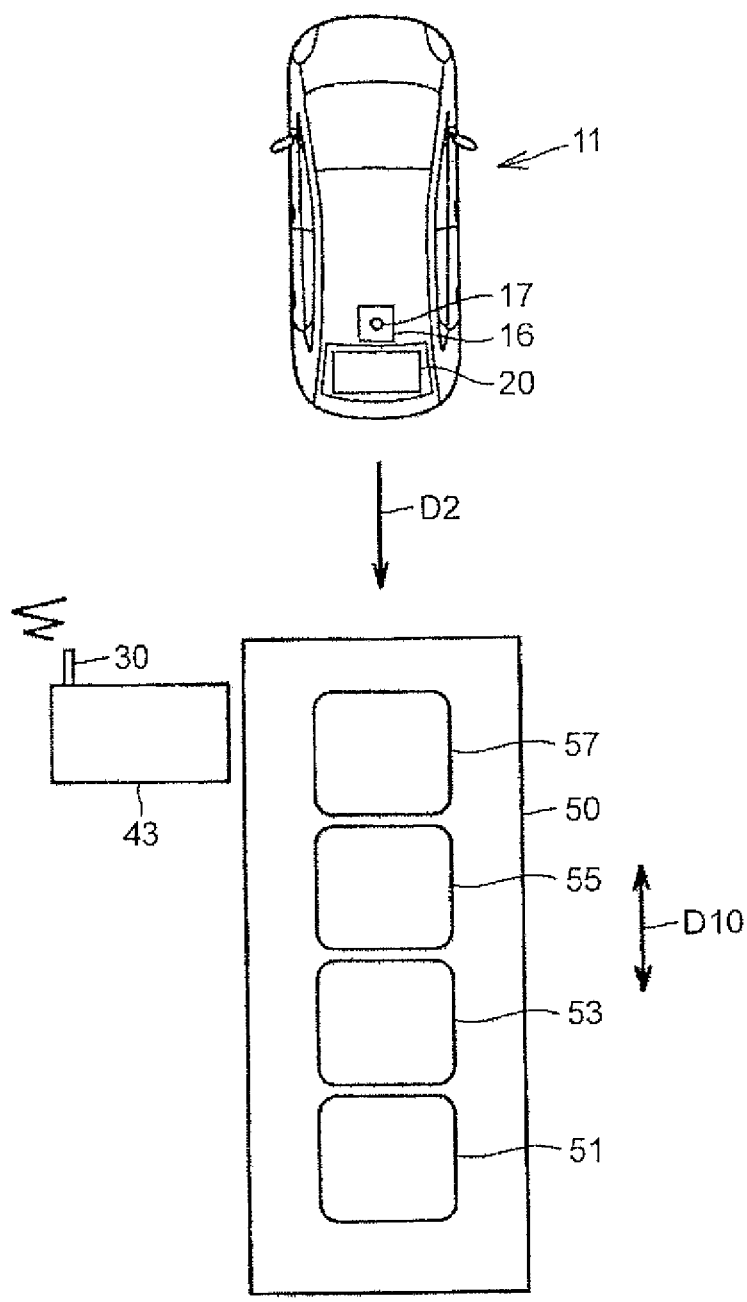
FIG. 3 is a plan view that schematically shows the power transmitting device and the vehicle according to the first embodiment of the invention.

As shown in FIG. 3, an approach direction D2 may be assumed as a direction in which the vehicle 11 approaches the parking lot 50. In the example shown in FIG. 3, the approach direction D2 is the reverse traveling direction of the vehicle 11; however, the vehicle 11 may travel forward in the approach direction D2.

Figure 4:
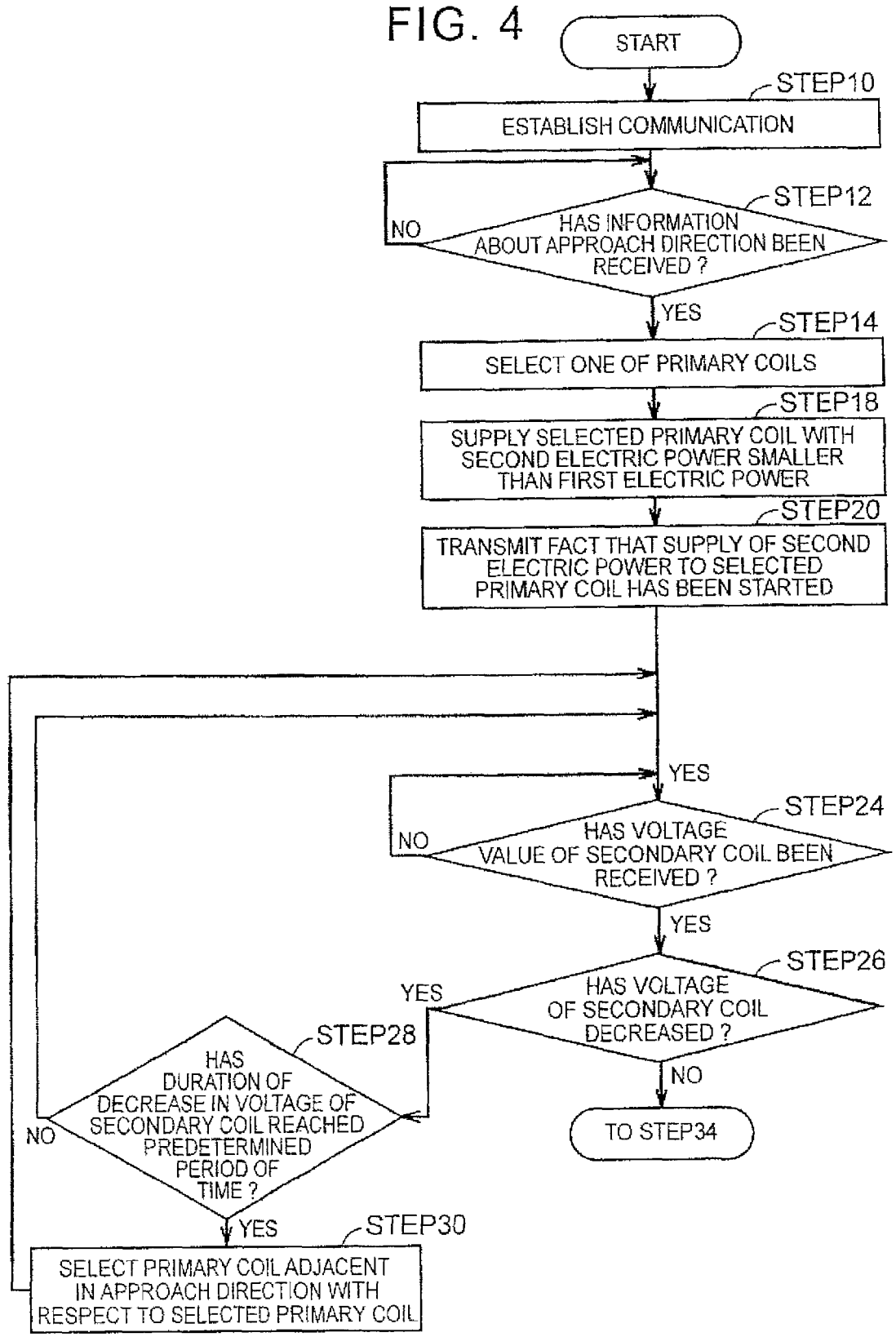
FIG. 4 is a flowchart that shows a control flow that is executed by a power transmitting-side control unit according to the first embodiment of the invention.
Figure 5:
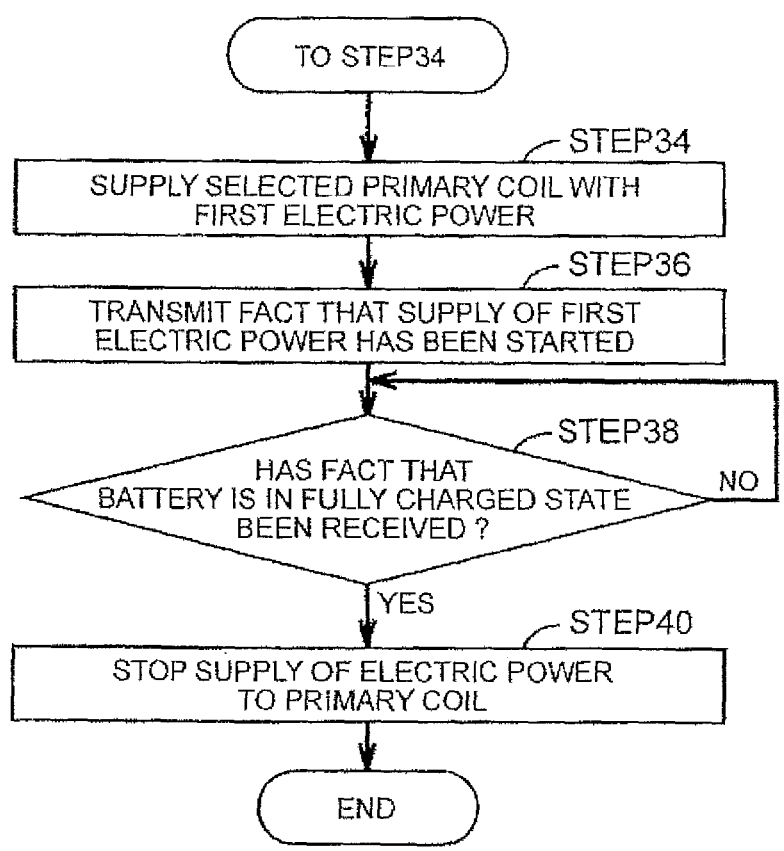
FIG. 5 is a flowchart that shows a control flow that is executed by the power transmitting-side control unit according to the first embodiment of the invention.
Figure 6:
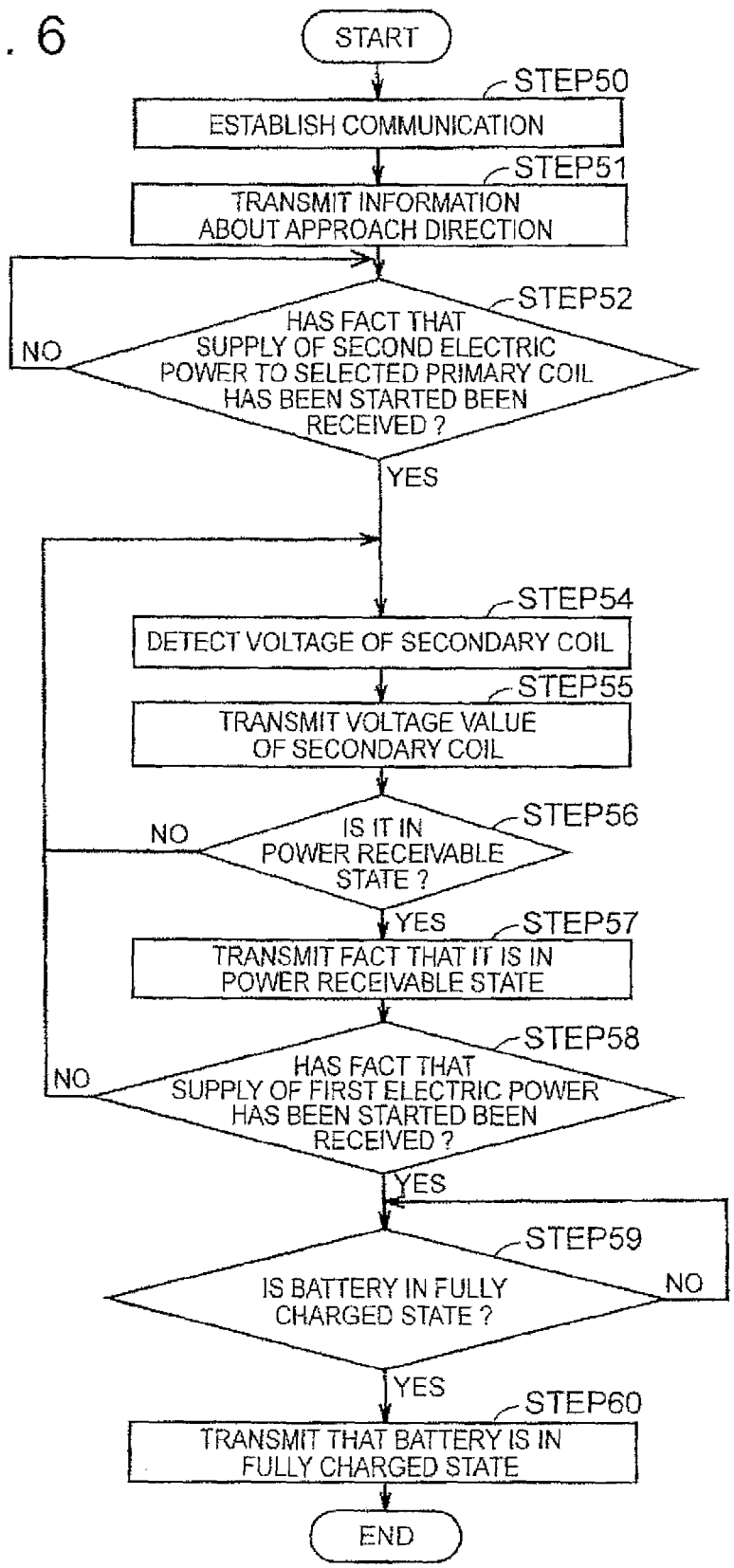
FIG. 6 shows a control flow that is executed by a vehicle-side control unit according to the first embodiment of the invention.

FIG. 4 and FIG. 5 show a control flow that is executed by the power transmitting-side control unit 43 in the process in which the vehicle 11 approaches the parking lot 50 from a state where the vehicle 11 is distanced from the parking lot 50, then stops within the parking lot 50 and, after that, completes charging operation. FIG. 6 shows a control flow that is executed by the vehicle-side control unit 16.

In FIG. 4, FIG. 6 and FIG. 2, when the vehicle 11 is located at a predetermined distance from the primary coils 51, 53, 55, 57, communication is established between the communication unit 17 and the communication unit 30 (STEP10, STEP50). Here, communication between the communication unit 17 and the communication unit 30 is established at a location at which the vehicle 11 is located at the predetermined distance from the parking lot 50.

When communication is established between the communication unit 30 and the communication unit 17, the vehicle-side control unit 16 causes the communication unit 17 to transmit the approach direction of the vehicle 11 (STEP51).

When communication is established between the communication unit 17 and the communication unit 30, the power transmitting-side control unit 43 determines whether information about the approach direction has been received from the vehicle 11 (STEP12).

When information about the approach direction of the vehicle 11 has been received ("YES" in STEP12), the power transmitting-side control unit 43 causes the selecting unit 44 to select one primary coil from among the plurality of primary coils 51, 53, 55, 57 on the basis of the received approach direction.

Here, communication is established in a state where the vehicle 11 is sufficiently distanced from the parking lot 50, so the power transmitting-side control unit 43 is able to start "STEP14", which is control for selecting one primary coil, before the secondary coil 20 passes through over the selected primary coil.

Figure 7:
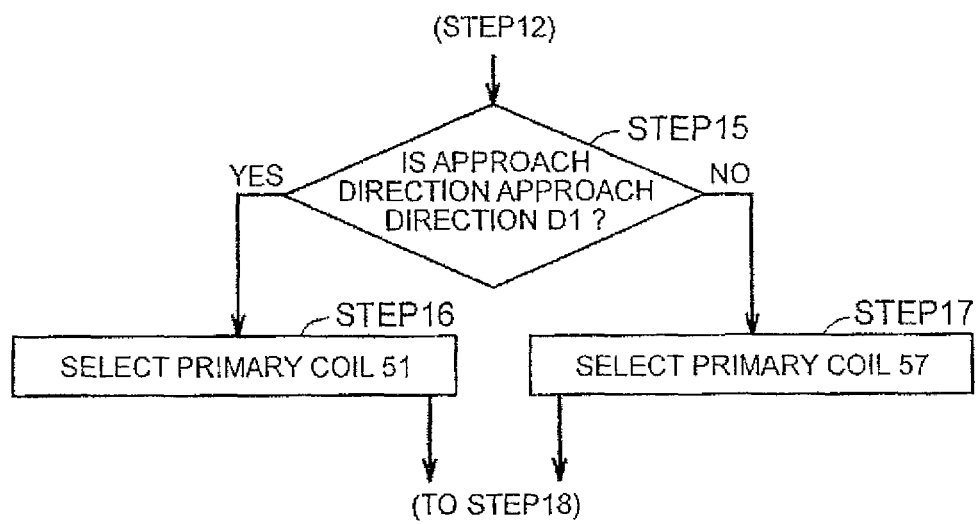
FIG. 7 shows a control flow associated with the steps shown in FIG. 4.

FIG. 7 shows a control flow that is executed in STEP14. As shown in the flowchart, the power transmitting-side control unit 43 determines whether the received approach direction of the vehicle 11 is the approach direction D1 (STEP15). When the power transmitting-side control unit 43 determines that the approach direction of the vehicle 11 is the approach direction D1 ("YES" in STEP15), the power transmitting-side control unit 43 selects the primary coil 51 (STEP16). Specifically, the power transmitting-side control unit 43 drives the selecting unit 44 such that the primary coil 51 is connected to the power supply unit 42.

On the other hand, when the power transmitting-side control unit 43 determines that the approach direction of the vehicle 11 is not the approach direction D1 ("NO" in STEP15), the power transmitting-side control unit 43 selects the primary coil 57 (STEP17). Specifically, the power transmitting-side control unit 43 drives the selecting unit 44 such that the primary coil 57 is connected to the power supply unit 42. For example, in the example shown in FIG. 2, the power transmitting-side control unit 43 causes the selecting unit 44 to select the primary coil 57.

In this way, the power transmitting-side control unit 43 causes the selecting unit 44 to select the primary coil, which is located at an upstream-side end in the approach direction of the vehicle 11, from among the plurality of primary coils 51, 53, 55, 57. Communication is established in a state where the vehicle 11 is sufficiently distanced from the parking lot 50, so the power transmitting-side control unit 43 completes selecting one primary coil before the secondary coil 20 passes through over the selected primary coil.

Subsequently, as shown in FIG. 4, the power transmitting-side control unit 43 causes the power supply unit 42 to supply the selected primary coil with a second electric power smaller than a first electric power (STEP18).

Then, the power transmitting-side control unit 43 transmits, to the vehicle 11, the fact that supply of the second electric power to the selected primary coil has been started (STEP20).

On the other hand, as shown in FIG. 6, after the vehicle-side control unit 16 has transmitted information about the approach direction, the vehicle-side control unit 16 determines whether the vehicle-side control unit 16 has received, from the power transmitting device 40, the fact that supply of the second electric power to the selected primary coil has been started (STEP52). When the vehicle-side control unit 16 determines that the vehicle-side control unit 16 has received, from the power transmitting device 40, the fact that supply of the second electric power to the selected primary coil has been started ("YES" in STEP52), the vehicle-side control unit 16 detects the voltage of the secondary coil 20. Specifically, the vehicle-side control unit 16 causes the voltmeter 19 to measure the voltage of the secondary coil 20, and the voltmeter 19 inputs the measured value to the vehicle-side control unit 16.

Subsequently, the vehicle-side control unit 16 transmits the voltage value of the secondary coil 20 to the power transmitting device 40 (STEP55).

Subsequently, the vehicle-side control unit 16 determines whether it is in a power receivable state (STEP56). Here, the power receivable state is, for example, a state where the vehicle 11 is stopped and a user has input a start of power receiving operation.

When the vehicle-side control unit 16 determines that it is not in the power receivable state, the vehicle-side control unit 16 repeats detecting the voltage of the secondary coil (STEP54) and transmitting the voltage value of the secondary coil (STEP55). On the other hand, when the vehicle-side control unit 16 determines that it is in the power receivable state, the vehicle-side control unit 16 transmits, to the power transmitting device 40, the fact that it is in the power receivable state (STEP57).

Then, the vehicle-side control unit 16 determines whether the fact that supply of the first electric power has been started has been received from the power transmitting device 40 (STEP58). When the vehicle-side control unit 16 determines that the fact that supply of the first electric power has been started has not been received ("NO" in STEP58), the vehicle-side control unit 16 repeats STEP54, STEP55, STEP56, STEP57.

On the other hand, in FIG. 4, after the fact that supply of the second electric power to the selected primary coil has been started has been transmitted, the power transmitting-side control unit 43 determines whether the voltage value of the secondary coil has been received (STEP24). When the power transmitting-side control unit 43 determines that the voltage value of the secondary coil has been received ("YES" in STEP24), the power transmitting-side control unit 43 determines whether the voltage value of the secondary coil 20 has decreased (STEP26).

When it is the first time to determine whether the voltage value of the secondary coil 20 has decreased, the power transmitting-side control unit 43 compares the received voltage value with, for example, +∞V.

As shown in FIG. 2, in a state where the primary coil 51 is selected first, the power transmitting-side control unit 43 receives the voltage value of the secondary coil 20 from the vehicle 11 for the first time. In this case, the power transmitting-side control unit 43 determines that the voltage value of the secondary coil 20 has decreased.

When the power transmitting-side control unit 43 determines that the voltage value of the secondary coil 20 has decreased ("YES" in STEP26), the power transmitting-side control unit 43 subsequently determines whether the duration of a period during which the voltage of the secondary coil 20 is decreased has reached a predetermined period of time (STEP28).

When the power transmitting-side control unit 43 determines that the duration of the period during which the voltage of the secondary coil 20 is decreased has not reached the predetermined period of time ("NO" in STEP28), the power transmitting-side control unit 43 receives the voltage value of the secondary coil 20 again ("YES" in STEP24), and determines whether the voltage value of the secondary coil 20 has decreased (STEP26).

Then, when the power transmitting-side control unit 43 determines that the duration of the period during which the voltage value of the secondary coil 20 has reached the predetermined period of time, the power transmitting-side control unit 43 selects the primary coil adjacent in the approach direction with respect to the selected primary coil (STEP30).

Specifically, the power transmitting-side control unit 43 interrupts connection between the primary coil, currently selected by the selecting unit 44, and the power supply unit 42, and connects the primary coil adjacent in the approach direction of the vehicle 11 to the power supply unit 42.

Figure 8:
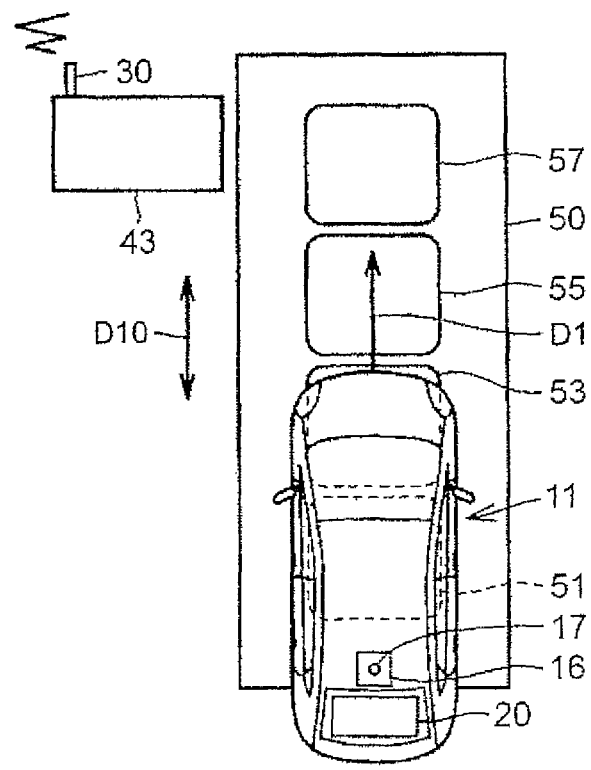
FIG. 8 is a plan view that schematically shows a state where the vehicle has started entering a parking lot in the first embodiment of the invention.
Figure 9:
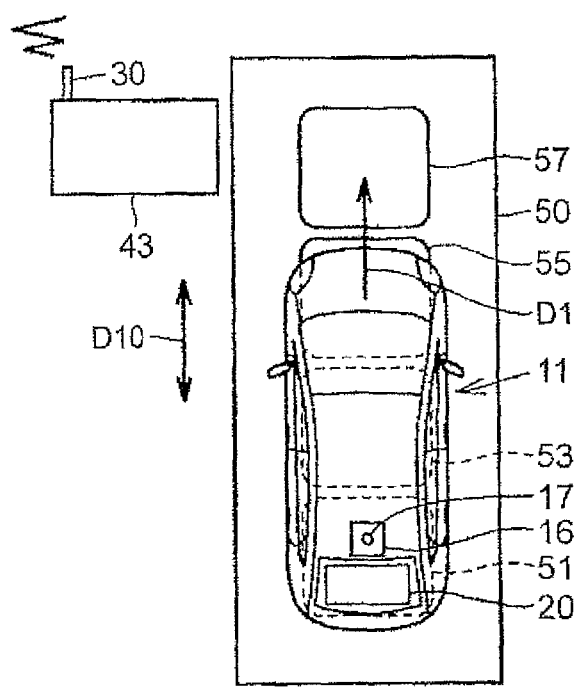
FIG. 9 is a plan view that schematically shows a state where the vehicle has started entering the parking lot in the first embodiment of the invention.

For example, when the vehicle 11 starts entering the parking lot 50 as shown in FIG. 8 and FIG. 9 from the state shown in FIG. 2, a power transfer efficiency between the primary coil 51 and the secondary coil 20 improves, and the voltage value of the secondary coil 20 continues increasing.

On the other hand, when the secondary coil 20 starts leaving from the primary coil 51, the voltage value of the secondary coil 20 starts decreasing. In this case, the power transmitting-side control unit 43 newly selects the primary coil 53.

In this way, the power transmitting-side control unit 43 changes the primary coil, selected by the selecting unit 44, with movement of the secondary coil 20.

In FIG. 4, when the power transmitting-side control unit 43 newly selects the primary coil (STEP30), the power transmitting-side control unit 43 executes STEP24, STEP26, STEP28.

Then, when the power transmitting-side control unit 43 determines that the voltage value of the secondary coil 20 has not decreased ("NO" in STEP26), the selected primary coil is set as a power transmitting coil and the first electric power is supplied to the power transmitting coil as shown in FIG. 5 (STEP34). Subsequently, the fact that supply of the first electric power has been started is transmitted to the vehicle 11 (STEP36).

In this way, the power transmitting-side control unit 43 selects the power transmitting coil from among the plurality of primary coils on the basis of a power receiving situation of the secondary coil. Then, in the first embodiment, the power receiving efficiency of the secondary coil 20 is employed as the power receiving situation of the secondary coil, and, more specifically, the receiving power of the secondary coil 20 is employed as the power receiving situation of the secondary coil.

The amount of current flowing through the secondary coil 20 is also included as the power receiving situation of the secondary coil.

In FIG. 6, when the vehicle-side control unit 16 determines that the fact that supply of the first electric power has been started has been received from the power transmitting device 40 (STEP58), the vehicle-side control unit 16 determines whether a battery is in a fully charged state (STEP59). When the vehicle-side control unit 16 determines that the battery is not in the fully charged state ("NO" in STEP59), the vehicle-side control unit 16 continues detecting the state of charge of the battery.

Then, when the vehicle-side control unit 16 determines that the battery is in the fully charged state ("YES" in STEP59), the vehicle-side control unit 16 transmits, to the power transmitting device 40, the fact that the battery is in the fully charged state (STEP60).

In FIG. 5, after the fact that supply of the first electric power has been started has been transmitted, the power transmitting-side control unit 43 determines whether the fact that the battery is in the fully charged state has been received from the vehicle 11 (STEP38).

Then, when the fact that the battery is in the fully charged state has been received ("YES" in STEP38), the power transmitting-side control unit 43 stops supply of electric power to the power transmitting coil.

As described above, with the power transmitting device 40 according to the first embodiment, when the vehicle 11 stops and enters the power receivable state, it is possible to immediately supply the first electric power to the power transmitting coil and transmit large electric power to the secondary coil 20.

Figure 10:
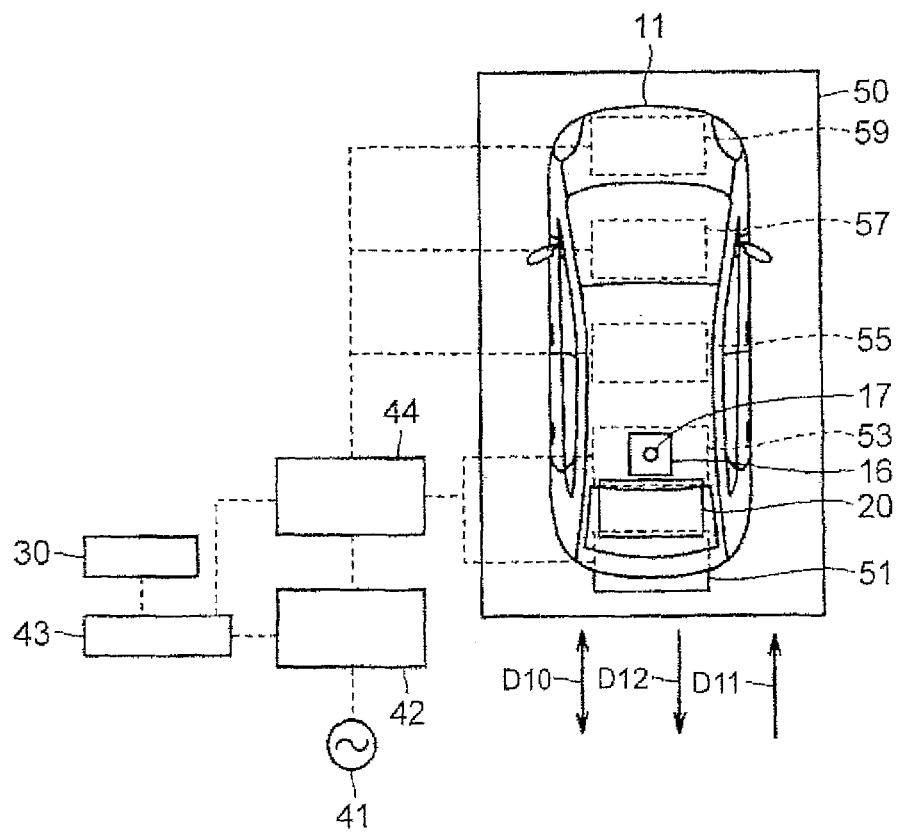
FIG. 10 is a plan view that schematically shows a vehicle and a power transmitting device according to a second embodiment of the invention.

Subsequently, a power transmitting device, a power receiving device and a power transfer system according to a second embodiment will be described with reference to FIG. 10 to FIG. 13. FIG. 10 is a plan view that schematically shows the vehicle 11 and the power transmitting device 40.

In the power transmitting device 40 according to the second embodiment, a plurality of primary coils 51, 53, 55, 57, 59 are arranged at intervals in the arrangement direction D10. The arrangement direction D10 is the longitudinal direction of the vehicle 11 stopped within the parking lot 50.

Among the plurality of primary coils 51, 53, 55, 57, 59, the primary coil 55 located at the center in the arrangement direction D10 is a center coil.

The power transmitting device 40 according to the second embodiment supplies the second electric power to the center coil (i.e. primary coil 55) at the time when the power transmitting device 40 starts control for selecting the power transmitting coil that is supplied with the first electric power. Then, the power transmitting device 40 newly selects the primary coil that is supplied with the second electric power on the basis of the position of the secondary coil 20. Then, the power transmitting device 40 selects the power transmitting coil from among the plurality of primary coils 51, 53, 55, 57, 59. In this way, by supplying the second electric power to the center coil first in a state where the vehicle 11 is stopped, it is possible to provide shielding against an electromagnetic field, formed between the center coil and the secondary coil 20, with the use of the vehicle 11.

Figure 11:
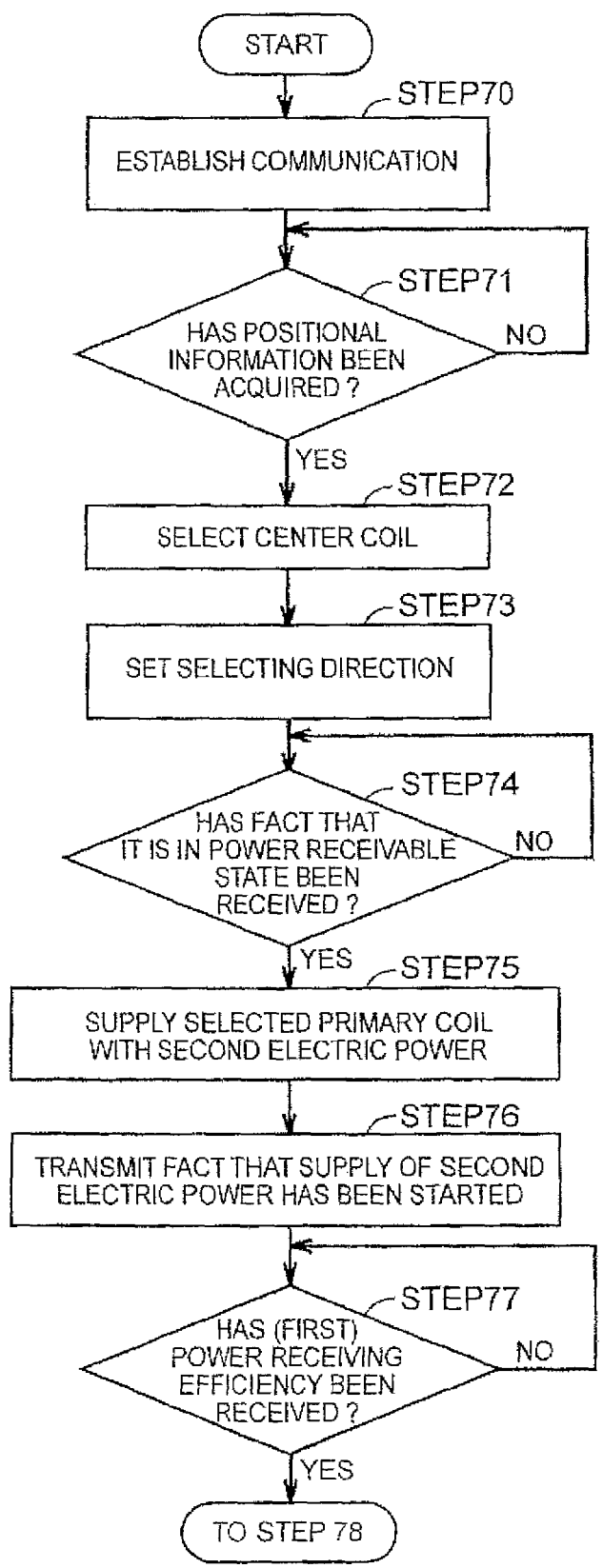
FIG. 11 is a flowchart that shows a control flow that is executed by a power transmitting-side control unit according to the second embodiment of the invention.
Figure 12:
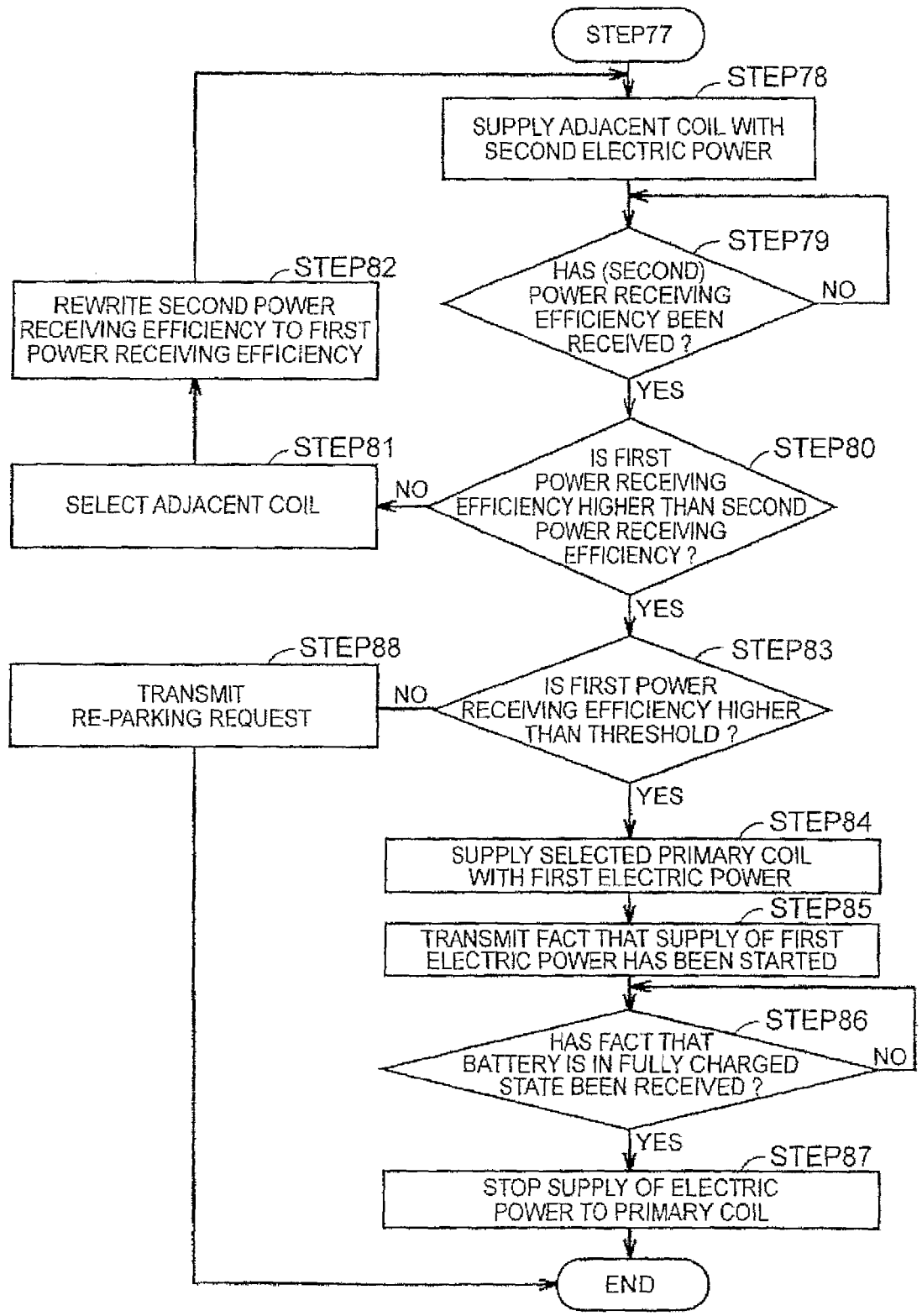
FIG. 12 is a flowchart that shows a control flow that is executed by the power transmitting-side control unit according to the second embodiment of the invention.
Figure 13:
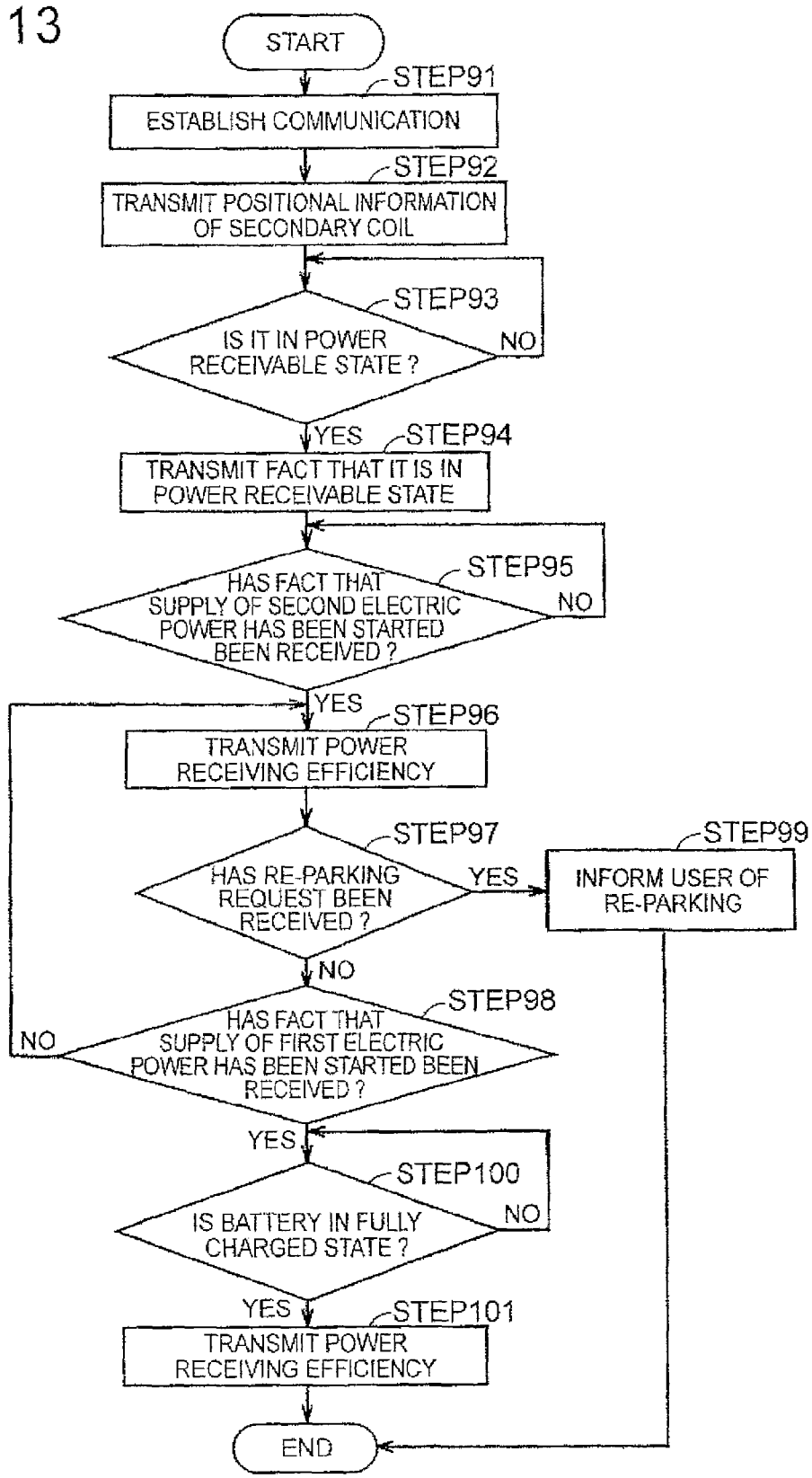
FIG. 13 shows a control flow that is executed by a vehicle-side control unit according to the second embodiment of the invention.

FIG. 11 and FIG. 12 are flowcharts that show a control flow that is executed by the power transmitting-side control unit 43. FIG. 13 is a flowchart that shows a control flow that is executed by the vehicle-side control unit 16.

In the second embodiment, as shown in FIG. 11 and FIG. 13, after the vehicle 11 is stopped, communication is established between the power transmitting device 40 and the vehicle 11 (STEP70, STEP91).

Subsequently, in FIG. 13, the vehicle-side control unit 16 transmits the positional information of the secondary coil 20 to the power transmitting device 40 (STEP92). The positional information of the secondary coil 20 includes information that indicates where the secondary coil 20 is provided in the vehicle 11. For example, the positional information includes information that indicates at which one of the center, front side and rear side in the longitudinal direction of the vehicle 11 the secondary coil 20 is arranged.

Subsequently, the vehicle-side control unit 16 determines whether it is in the power receivable state (STEP93). When the vehicle-side control unit 16 determines that it is in the power receivable state ("YES" in STEP93), the fact that it is in the power receivable state is transmitted to the power transmitting device 40 (STEP94). Subsequently, the vehicle-side control unit 16 waits until the fact that supply of the second electric power has been started is received from the power transmitting device 40 (STEP95).

In FIG. 11, after communication has been established, the power transmitting-side control unit 43 determines whether the positional information of the secondary coil has been received from the vehicle 11 (STEP71). When the power transmitting-side control unit 43 determines that the positional information has been received ("YES" in STEP71), the power transmitting-side control unit 43 causes the selecting unit 44 to select the primary coil 55 that is the center coil (STEP72).

Subsequently, the power transmitting-side control unit 43 sets a selecting direction on the basis of the acquired positional information of the secondary coil. Specifically, the power transmitting-side control unit 43 determines whether the secondary coil 20 is located on the primary coil 59 side with respect to the center coil or the secondary coil 20 is located on the primary coil 51 side with respect to the primary coil 55. Then, when the power transmitting-side control unit 43 determines that the secondary coil 20 is located on the primary coil 59 side with respect to the primary coil 55, the power transmitting-side control unit 43 sets the selecting direction to a selecting direction D11. On the other hand, when the power transmitting-side control unit 43 determines that the secondary coil 20 is located on the primary coil 51 side with respect to the primary coil 55, the power transmitting-side control unit 43 sets the selecting direction to a selecting direction D12.

In the example shown in FIG. 10, the secondary coil 20 is arranged at the rear side of the vehicle 11, so the selecting direction is the selecting direction D12.

Subsequently, the power transmitting-side control unit 43 determines whether the fact that it is in the power receivable state has been received from the vehicle 11 (STEP74). When the power transmitting-side control unit 43 determines that the fact that it is in the power receivable state has been received from the vehicle 11 ("YES" in STEP74), the second electric power is supplied to the selected primary coil (STEP75).

Subsequently, the power transmitting-side control unit 43 transmits, to the vehicle 11, the fact that supply of the second electric power has been started (STEP76).

In FIG. 13, when the vehicle-side control unit 16 determines that the fact that supply of the second electric power has been started has been received from the power transmitting device 40 ("YES" in STEP95), the vehicle-side control unit 16 transmits the power receiving efficiency of the secondary coil 20 to the power transmitting device 40 (STEP96). The vehicle-side control unit 16 may transmit an electric power value to the power transmitting-side control unit 43, and the power transmitting-side control unit 43 may calculate the power receiving efficiency.

The vehicle-side control unit 16 acquires the voltage value that is supplied from the power transmitting device 40 to the selected primary coil at the time when the fact that supply of the second electric power has been started is received from the power transmitting device 40. Then, the vehicle-side control unit 16 acquires the voltage value of the secondary coil 20 from the voltage sensor provided at the secondary coil 20, and calculates the power receiving efficiency on the basis of the voltage value of the secondary coil 20 and the voltage value of the primary coil. Then, the vehicle-side control unit 16 transmits the calculated power receiving efficiency to the power transmitting device 40.

Subsequently, the vehicle-side control unit 16 determines whether a re-parking request has been received from the power transmitting device 40 (STEP97). Then, when the vehicle-side control unit 16 determines that a re-parking request has not been received from the power transmitting device 40 ("NO" in STEP97), the vehicle-side control unit 16 determines whether the fact that supply of the first electric power has been started has been received from the power transmitting-side control unit 43 (STEP98). Then, when the vehicle-side control unit 16 determines that the fact that supply of the first electric power has been started has not been received, the vehicle-side control unit 16 calculates the power receiving efficiency again. Then, the vehicle-side control unit 16 transmits the power receiving efficiency to the power transmitting device 40 (STEP96).

When the vehicle-side control unit 16 determines that the re-parking request has been received from the power transmitting device 40 ("YES" in STEP97), the vehicle-side control unit 16 informs the user of re-parking in STEP99.

In FIG. 11, after the fact that supply of the second electric power has been started has been transmitted, the power transmitting-side control unit 43 waits until the power receiving efficiency is received from the vehicle 11 (STEP77). When the power transmitting-side control unit 43 receives the power receiving efficiency from the vehicle 11 ("YES" in STEP77), the power transmitting-side control unit 43 stores the acquired power receiving efficiency in a storage unit of the power transmitting-side control unit 43 as a first power receiving efficiency.

Subsequently, the power transmitting-side control unit 43 drives the selecting unit 44 to interrupt connection between the currently selected primary coil and the power supply unit 42 and supply the second electric power to the primary coil adjacent in the selecting direction with respect to the selected primary coil (STEP78).

In the example shown in FIG. 10, when the primary coil 55 is the selected primary coil, the primary coil 53 is the adjacent coil.

Then, the power transmitting-side control unit 43 waits until the power receiving efficiency is received from the vehicle 11 (STEP79). When the power receiving efficiency has been acquired from the vehicle 11, the power transmitting-side control unit 43 stores the acquired power receiving efficiency in the storage unit of the power transmitting-side control unit 43 as a second power receiving efficiency.

Subsequently, the power transmitting-side control unit 43 compares the first power receiving efficiency with the second power receiving efficiency and determines whether the first power receiving efficiency is higher than the second power receiving efficiency (STEP80).

When the power transmitting-side control unit 43 determines that the first power receiving efficiency is lower than or equal to the second power receiving efficiency ("NO" in STEP80), the power transmitting-side control unit 43 selects the adjacent coil (STEP81).

Subsequently, the power transmitting-side control unit 43 rewrites the second power receiving efficiency, stored in the storage unit of the power transmitting-side control unit 43, to the first power receiving efficiency (STEP82). Subsequently, the power transmitting-side control unit 43 supplies the second electric power to the primary coil (adjacent coil) adjacent in the selecting direction with respect to the newly selected primary coil (STEP78).

Then, the power transmitting-side control unit 43 acquires the power receiving efficiency from the vehicle 11 (STEP79). The power transmitting-side control unit 43 stores the acquired power receiving efficiency in the storage unit of the power transmitting-side control unit 43 as the second power receiving efficiency.

Subsequently, the power transmitting-side control unit 43 determines whether the stored first power receiving efficiency is higher than the second power receiving efficiency (STEP80).

Here, when the power transmitting-side control unit 43 determines that the first power receiving efficiency is higher than the second power receiving efficiency ("YES" in STEP80), the power transmitting-side control unit 43 determines whether the first power receiving efficiency is higher than a threshold (STEP83).

Then, when the power transmitting-side control unit 43 determines that the first power receiving efficiency is lower than or equal to the threshold ("NO" in STEP83), the power transmitting-side control unit 43 transmits the re-parking request to the vehicle 11 (STEP88). In FIG. 13, STEP96 to STEP98 are repeated until the re-parking request is received from the power transmitting device 40. When the re-parking request is received from the power transmitting device 40 ("YES" in STEP97), the vehicle-side control unit 16 informs the user to park the vehicle 11 again (STEP99).

This is because, in the above-described case, the vehicle 11 is highly likely to significantly deviate from any of the primary coils 51, 53, 55, 57, 59.

On the other hand, in FIG. 10, when the power transmitting-side control unit 43 determines that the first power receiving efficiency is higher than the threshold ("YES" in STEP83), the power transmitting-side control unit 43 sets the currently selected primary coil as the power transmitting coil and supplies the first electric power to the power transmitting coil (STEP84).

In this way, with the power transmitting device 40 according to the second embodiment, the power transmitting coil is set at the time when the first power receiving efficiency is higher than the second power receiving efficiency and the first power receiving efficiency is higher than the threshold. Thus, there are many cases where it is possible to set the power transmitting coil without selecting the primary coils 51, 59 located at the ends from among the plurality of primary coils 51, 53, 55, 57, 59. Thus, it is possible to set the power transmitting coil in a short period of time.

In FIG. 13, the vehicle-side control unit 16 repeats STEP96 to STEP98 until the re-parking request or the fact that supply of the first electric power has been started is received from the power transmitting device 40. Then, when the fact that supply of the first electric power has been started has been received from the power transmitting device 40 ("YES" in STEP98), the vehicle-side control, unit 16 determines whether the battery is in the fully charged state (STEP100).

Then, when the vehicle-side control unit 16 determines that the battery is in the fully charged state, the fact that the battery is in the fully charged state is transmitted to the power transmitting device 40 (STEP101).

In FIG. 12, after the fact that the first electric power is supplied to the power transmitting coil has been transmitted to the vehicle 11, the power transmitting-side control unit 43 determines whether the fact that the battery is in the fully charged state has been received from the vehicle 11 (STEP86). The power transmitting-side control unit 43 continues supplying electric power to the power transmitting coil until the fact that the battery is in the fully charged state is received from the vehicle 11. When the fact that the battery is in the fully charged state has been received from the vehicle 11 (STEP86), the power transmitting-side control unit 43 stops supplying electric power to the power transmitting coil (STEP87).

Next, a third embodiment will be described. A power transmitting device, a power receiving device and a power transfer system according to the third embodiment will be described with reference to FIG. 14 to FIG. 16.

When the power transmitting device 40 according to the third embodiment determines that a power transmitting situation between the current power transmitting coil and the secondary coil 20 does not satisfy a power transmitting condition after supply of the first electric power to the power transmitting coil has been started, the power transmitting device 40 stops transmission of electric power from the power transmitting coil to the secondary coil 20. After that, the primary coil having a power receiving efficiency higher than the threshold is selected from among the plurality of primary coils, the first electric power is supplied to the selected primary coil, and transfer of electric power to the secondary coil 20 is resumed.

The fact that the power transmitting situation does not satisfy the power transmitting condition includes a case where the temperature of the power transmitting coil has exceeded a threshold, a case where the distance between the power transmitting coil and the secondary coil 20 has exceeded a threshold, a case where foreign matter has entered between the power transmitting coil and the secondary coil 20, and the like.

In the third embodiment, an example in which the temperature of the power transmitting coil is employed as the power transmitting condition (power transmitting situation) will be described.

Figure 14:
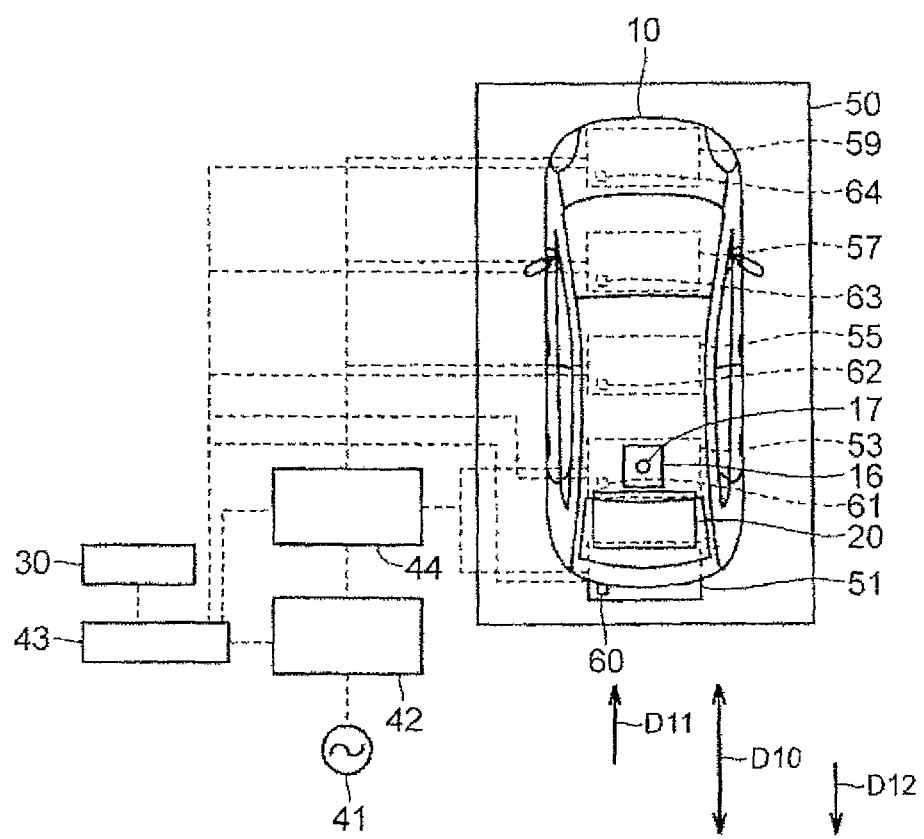
FIG. 14 is a plan view that schematically shows a power transmitting device and a vehicle according to a third embodiment of the invention.

FIG. 14 is a plan view that schematically shows the power transmitting device 40 and the vehicle 11 according to the third embodiment. As shown in FIG. 14, the power transmitting device 40 includes a temperature measuring unit 60 that measures the temperature of the primary coil 51, a temperature measuring unit 61 that measures the temperature of the primary coil 53, a temperature measuring unit 62 that measures the temperature of the primary coil 55, a temperature measuring unit 63 that measures the temperature of the primary coil 57 and a temperature measuring unit 64 that measures the temperature of the primary coil 59. Then, the temperature measuring units 60, 61, 62, 63, 64 input the measured temperatures to the vehicle-side control unit 16.

Figure 15:
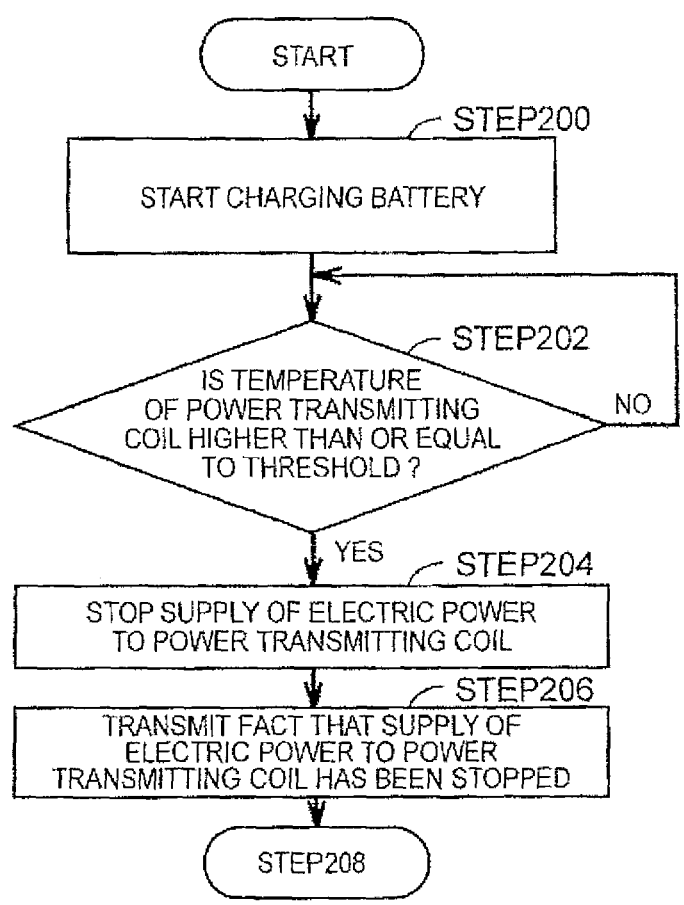
FIG. 15 is a flowchart that shows a control flow that is executed by the power transmitting-side control unit according to the third embodiment of the invention.
Figure 16:
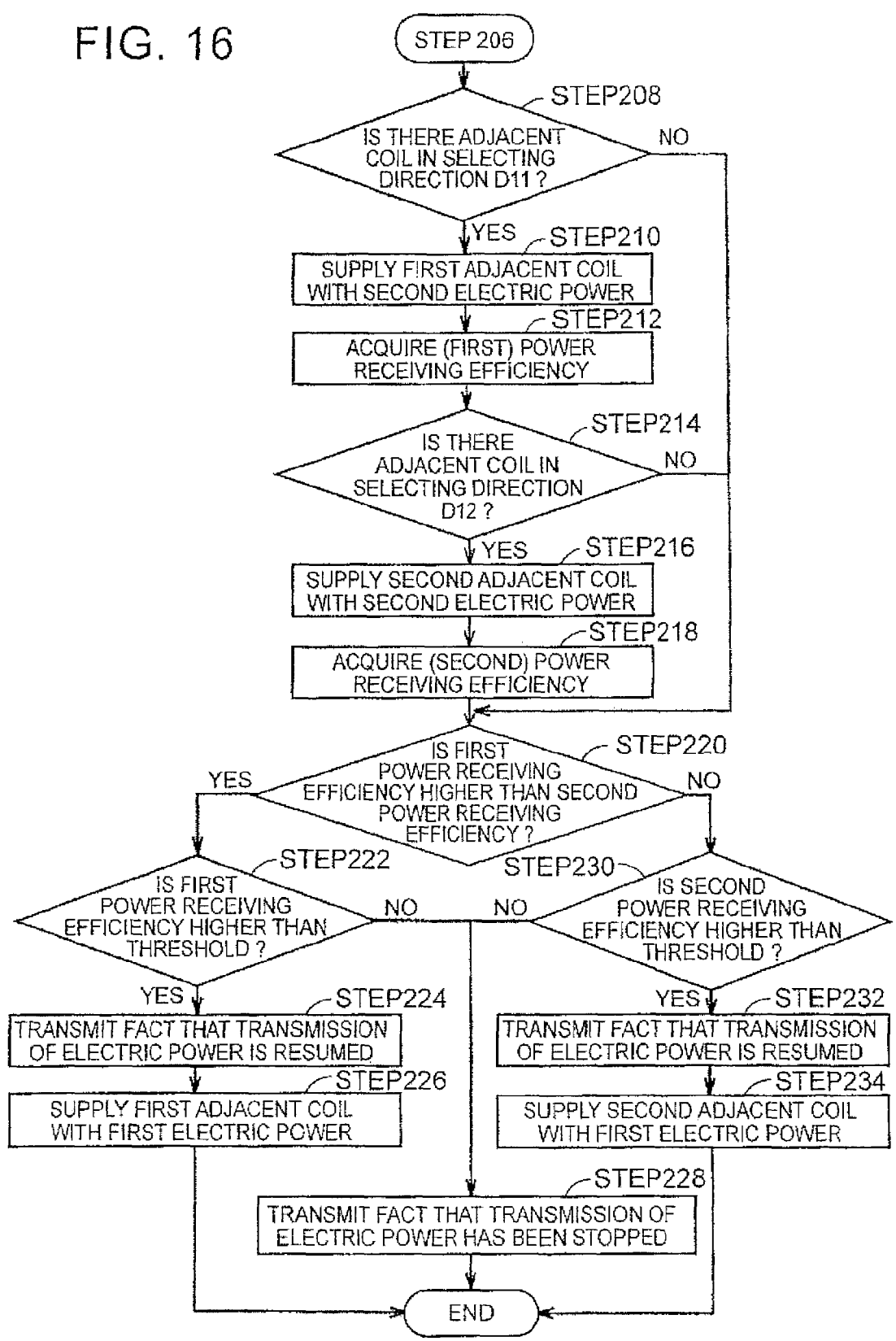
FIG. 16 is a flowchart that shows a control flow that is executed by the power transmitting-side control unit according to the third embodiment of the invention.
Figure 17:
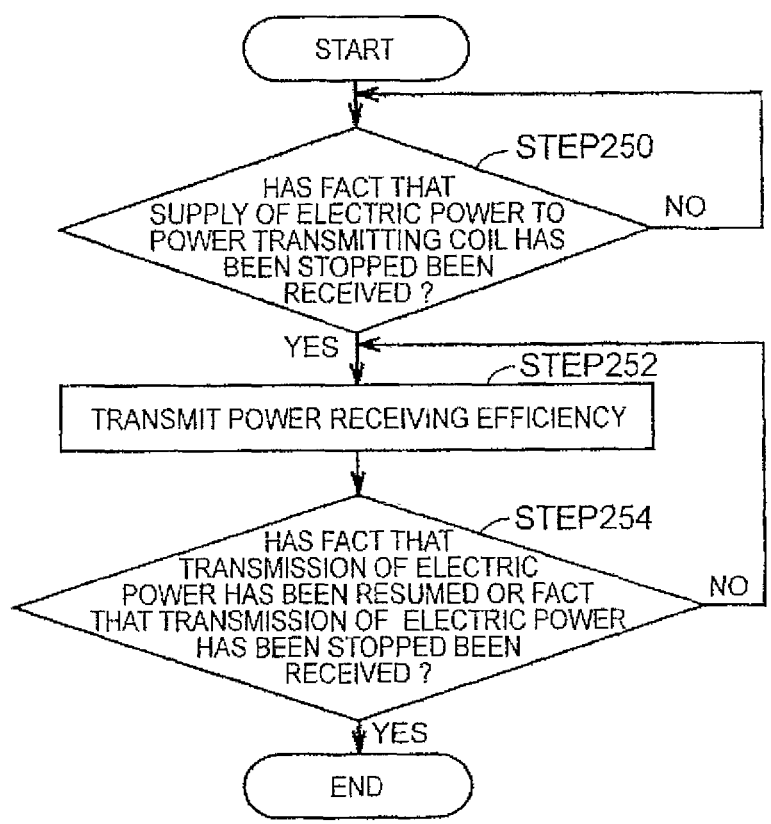
FIG. 17 is a flowchart that shows a control flow that is executed by a vehicle-side control unit according to the third embodiment of the invention.

FIG. 15 and FIG. 16 are flowcharts that show a control flow that is executed by the power transmitting-side control unit 43. FIG. 17 is a flowchart that shows a control flow that is executed by the vehicle-side control unit 16.

In FIG. 15, the power transmitting-side control unit 43 starts charging the battery of the vehicle 11 (STEP200). For example, the control flows according to the first and second embodiments may be employed as a flow of charging the battery of the vehicle 11.

Subsequently, the power transmitting-side control unit 43 determines whether the temperature of the power transmitting coil is higher than or equal to the threshold (STEP202). For example, in the example shown in FIG. 15, the primary coil 53 is set as the power transmitting coil, the first electric power is supplied to the primary coil 53, and electric power is transmitted from the primary coil 53 to the secondary coil 20.

When the power transmitting-side control unit 43 determines that the temperature of the power transmitting coil is lower than the threshold, the power transmitting-side control unit 43 continues transmitting electric power from the power transmitting coil to the secondary coil 20.

On the other hand, when the power transmitting-side control unit 43 determines that the temperature of the power transmitting coil is higher than or equal to the threshold ("YES" in STEP202), the power transmitting-side control unit 43 stops supply of electric power to the power transmitting coil (STEP204). Subsequently, the power transmitting-side control unit 43 transmits, to the vehicle 11, the fact that transmission of electric power is interrupted (STEP206). In FIG. 17, the vehicle-side control unit 16 determines whether the fact that supply of electric power to the power transmitting coil has been stopped has been received from the power transmitting device 40 (STEP250). When the vehicle-side control unit 16 determines that the fact that supply of electric power to the power transmitting coil has been stopped has been received ("YES" in STEP250), the vehicle-side control unit 16 transmits the power receiving efficiency to the power transmitting device 40 (STEP252). When the vehicle-side control unit 16 has received the fact that the transmission of electric power has been resumed or the fact that the transmission of electric power has been stopped ("YES" in STEP254), the vehicle-side control unit 16 stops transmitting the power receiving efficiency.

After the fact that transmission of electric power has been interrupted has been transmitted, the power transmitting-side control unit 43 executes coil re-selecting control. Specifically, the coil re-selecting control includes STEP208 to STEP234 described below. The power transmitting-side control unit 43 determines whether there is the primary coil adjacent in the selecting direction D11 with respect to the power transmitting coil (STEP208). When the power transmitting-side control unit 43 determines that there is a first adjacent coil adjacent in the selecting direction D11 with respect to the power transmitting coil ("YES" in STEP208), the power transmitting-side control unit 43 supplies the second electric power to the first adjacent coil (STEP210). Subsequently, the power transmitting-side control unit 43 acquires the (first) power receiving efficiency of the secondary coil 20 from the vehicle 11 (STEP212).

Subsequently, the power transmitting-side control unit 43 determines whether there is a second adjacent coil adjacent in the selecting direction D12 with respect to the power transmitting coil (STEP214). When the power transmitting-side control unit 43 determines that there is the second adjacent coil ("YES" in STEP214), the power transmitting-side control unit 43 supplies the second electric power to the second adjacent coil (STEP216). Subsequently, the power transmitting-side control unit 43 acquires the power receiving efficiency (second power receiving efficiency) from the vehicle 11 (STEP218).

Subsequently, the power transmitting-side control unit 43 determines whether the first power receiving efficiency is higher than the second power receiving efficiency (STEP220). When the power transmitting-side control unit 43 determines that the first power receiving efficiency is higher than the second power receiving efficiency ("YES" in STEP220), the power transmitting-side control unit 43 determines whether the first power receiving efficiency is higher than the threshold (STEP222).

When the power transmitting-side control unit 43 determines in STEP208 that there is no first adjacent coil, the power transmitting-side control unit 43 determines that the first power receiving efficiency is 0. When the power transmitting-side control unit 43 determines in STEP214 that there is no second adjacent coil, the power transmitting-side control unit 43 determines that the second power receiving efficiency is 0.

When the power transmitting-side control unit 43 determines that the first power receiving efficiency is higher than the threshold ("YES" in STEP222), the power transmitting-side control unit 43 transmits, to the vehicle 11, the fact that transmission of electric power is resumed (STEP224). Then, the power transmitting-side control unit 43 supplies the first electric power to the first adjacent coil (STEP226).

When the power transmitting-side control unit 43 determines in STEP222 that the first power receiving efficiency is lower than or equal to the threshold, the power transmitting-side control unit 43 transmits, to the vehicle 11, the fact that charging operation is stopped (STEP228).

When the power transmitting-side control unit 43 determines in STEP220 that the second power receiving efficiency is higher than or equal to the first power receiving efficiency ("NO" in STEP220), the power transmitting-side control unit 43 determines whether the second power receiving efficiency is higher than the threshold (STEP230).

When the power transmitting-side control unit 43 determines that the second power receiving efficiency is higher than the threshold ("YES" in STEP230), the power transmitting-side control unit 43 transmits, to the vehicle 11, the fact that transmission of electric power is resumed (STEP232). Subsequently, the power transmitting-side control unit 43 supplies the first electric power to the second adjacent coil (STEP234). On the other hand, when the power transmitting-side control unit 43 determines in STEP230 that the second power receiving efficiency is lower than or equal to the threshold ("NO" in STEP230), the power transmitting-side control unit 43 transmits, to the vehicle 11, the fact that transmission of electric power is stopped (STEP228).

In this way, in the third embodiment, after transmission of electric power to the secondary coil 20 has been started, when the temperature of the power transmitting coil becomes higher than or equal to the threshold, a new power transmitting coil is set on the basis of the power receiving efficiency of the secondary coil 20 from each of the two adjacent primary coils adjacent to the power transmitting coil.

Therefore, it is possible to suppress degradation of the primary coils, and it is possible to resume transmission of electric power to the secondary coil 20 in a short period of time.

In this way, in the present embodiment, the power transmitting coil is selected from among the primary coils 51, 53, 55, 57 on the basis of the power transmitting situation, that is, the temperature of the power transmitting coil.

Whether foreign matter has been detected may be employed as the power transmitting situation, and the power transmitting coil may be set on the basis of the power receiving efficiency of the secondary coil 20 from the first adjacent coil adjacent to the power transmitting coil and the power receiving efficiency of the secondary coil 20 from the second adjacent coil at the time when foreign matter has been detected.

Figure 18:
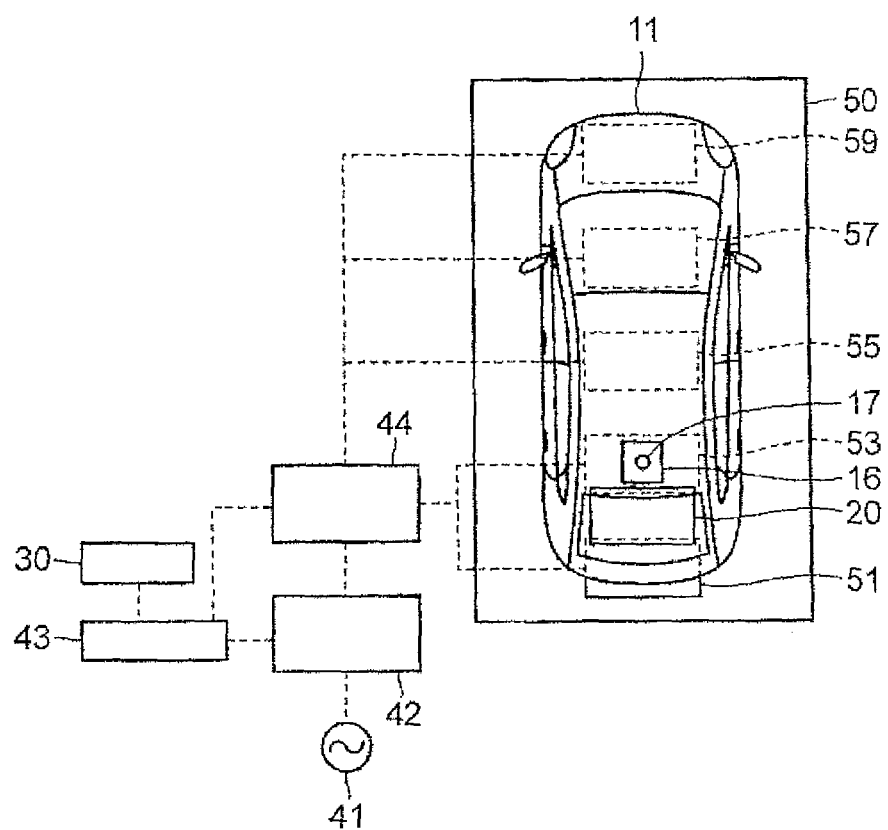
FIG. 18 is a plan view that schematically shows a vehicle and a power transmitting device according to a fourth embodiment of the invention.

Next, a fourth embodiment will be described. A power transmitting device, a power receiving device and a power transfer system according to the fourth embodiment will be described with reference to FIG. 18 and FIG. 19. FIG. 18 is a plan view that schematically shows the vehicle 11 and the power transmitting device 40 according to the fourth embodiment.

In the process in which the first electric power is supplied to the power transmitting coil and electric power is transmitted from the power transmitting device 40 to the vehicle 11, for example, a passenger of the vehicle 11 may get off from the vehicle 11 or the user may unload a baggage, loaded on the vehicle 11, from the vehicle 11.

At this time, the vehicle height of the vehicle 11 fluctuates, and the power receiving efficiency at which the power receiving coil receives electric power from the power transmitting coil fluctuates. Then, when the distance between the power transmitting coil and the secondary coil 20 has fluctuated in the process in which the power transmitting coil is set and electric power is being transmitted from the power transmitting coil to the vehicle 11, the power transmitting device according to the present embodiment newly sets the first adjacent coil or second adjacent coil adjacent to the power transmitting coil as a new power transmitting coil.

In this way, the power transmitting device 40 newly sets the power transmitting coil from among the plurality of primary coils 51, 53, 55, 57 on the basis of the power transmitting situation, that is, the distance between the power transmitting coil and the secondary coil 20. Thus, even when the power receiving efficiency of the secondary coil 20 decreases as a result of fluctuations in the power transmitting situation, it is possible to suppress a decrease in the power receiving efficiency of the secondary coil 20 by newly setting the power transmitting coil.

Figure 19:
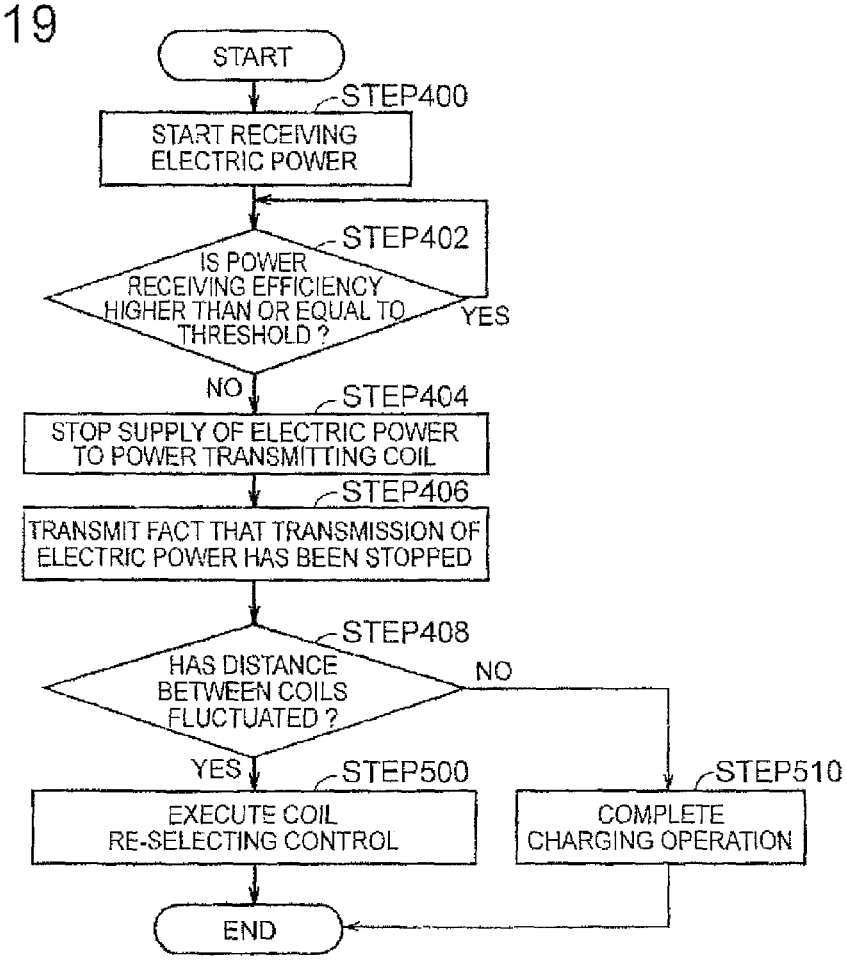
FIG. 19 is a flowchart that shows a control flow that is executed by a power transmitting-side control unit according to the fourth embodiment of the invention.

FIG. 19 is a flowchart that shows a control flow that is executed by the power transmitting-side control unit 43. As shown in FIG. 19, the power transmitting-side control unit 43 starts transmission of electric power to the secondary coil 20 by supplying the first electric power to the power transmitting coil (STEP400), the power transmitting-side control unit 43 determines whether the power receiving efficiency of the secondary coil 20 is higher than or equal to a threshold (STEP402).

When the power transmitting-side control unit 43 determines that the power receiving efficiency at which electric power is received by the secondary coil 20 is lower than the threshold, the power transmitting-side control unit 43 stops supply of electric power to the power transmitting coil (STEP404).

Subsequently, the power transmitting-side control unit 43 transmits, to the vehicle 11, the fact that transmission of electric power has been stopped (STEP406). Subsequently, the power transmitting-side control unit 43 determines whether the distance between the power transmitting coil and the secondary coil has fluctuated (STEP408).

The power transmitting-side control unit 43 determines whether the distance between the power transmitting coil and the secondary coil 20 has fluctuated (STEP408). When the power transmitting-side control unit 43 determines that the distance between the power transmitting coil and the secondary coil 20 has fluctuated as Compared to that at the time when transmission of electric power is started ("YES" in STEP408), the power transmitting-side control unit 43 executes coil re-selecting control (STEP500). The coil re-selecting control includes STEP208 to STEP234 in FIG. 16.

When the power transmitting-side control unit 43 determines in STEP408 that the distance between the coils has not fluctuated ("NO" in STEP408), the power transmitting-side control unit 43 stops supply of electric power to the primary coil and stops charging the battery (STEP510).

Figure 20:
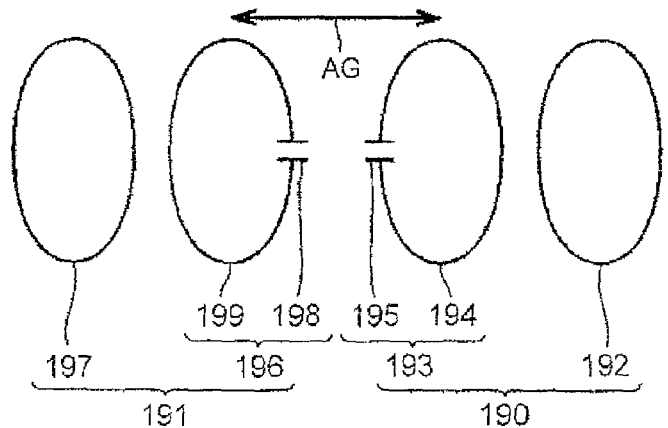
FIG. 20 is a view that shows a simulation model of a power transfer system.

Next, the principle of transfer of electric power, which is carried out between the power receiving unit 12 and any one of the power transmitting units 45, 46, 47, 48 (see FIG. 1), will be described with reference to FIG. 20 to FIG. 22.

In the power transfer systems according to the first to fourth embodiments, the difference between the natural frequency of each of the power transmitting units 45, 46, 47, 48 and the natural frequency of the power receiving unit 12 is smaller than or equal to 10% of the natural frequency of the power receiving unit 12 or the natural frequency of each of the power transmitting units 45, 46, 47, 48. By setting the natural frequency of each of the power transmitting units 45, 46, 47, 48 and the natural frequency of the power receiving unit 12 within the above range, it is possible to improve the power transfer efficiency. On the other hand, when the difference in natural frequency is larger than 10% of the natural frequency of the power receiving unit 12 or the natural frequency of each of the power transmitting units 45, 46, 47, 48, the power transfer efficiency becomes lower than 10%, so there occurs an inconvenience, such as an increase in the charging time of the battery.

Here, the natural frequency of each of the power transmitting units 45, 46, 47, 48, in the case where no capacitors 52, 54, 56, 58 are provided, means an oscillation frequency in the case where the electrical circuit formed of the inductance of a corresponding one of the primary coils 51, 53, 55, 57 and the capacitance of a corresponding one of the primary coils 51, 53, 55, 57 freely oscillates. In the case where the capacitors 52, 54, 56, 58 are provided, the natural frequency of each of the power transmitting units 45, 46, 47, 48 means an oscillation frequency in the case where the electrical circuit formed of the capacitance of a corresponding one of the primary coils 51, 53, 55, 57, the capacitance of a corresponding one of the capacitors 52, 54, 56, 58 and the inductance of a corresponding one of the primary coils 51, 53, 55, 57 freely oscillates. In the above-described electrical circuits, the natural frequency at the time when braking force and electric resistance are set to zero or substantially zero is called the resonance frequency of each of the power transmitting units 45, 46, 47, 48.

Similarly, the natural frequency of the power receiving unit 12, in the case where no capacitor 21 is provided, an oscillation frequency in the case where the electrical circuit formed of the inductance of the secondary coil 20 and the capacitance of the secondary coil 20 freely oscillates. In the case where the capacitor 21 is provided, the natural frequency of the power receiving unit 12 means an oscillation frequency in the case where the electrical circuit formed of the capacitance of the secondary coil 20, the capacitance of the capacitor 21 and the inductance of the secondary coil 20 freely oscillates. In the above-described electrical circuits, the natural frequency at the time when braking force and electric resistance are set to zero or substantially zero is called the resonance frequency of the power receiving unit 12.

Results of simulation that analyzes the correlation between a difference in natural frequency and a power transfer efficiency will be described with reference to FIG. 20 and FIG. 21. FIG. 20 is a view that shows a simulation model of a power transfer system. The power transfer system includes a power transmitting device 190 and a power receiving device 191. The power transmitting device 190 includes a coil 192 (electromagnetic induction coil) and a power transmitting unit 193. The power transmitting unit 193 includes a coil 194 (primary coil) and a capacitor 195 provided in the coil 194.

The power receiving device 191 includes a power receiving unit 196 and a coil 197 (electromagnetic induction coil). The power receiving unit 196 includes a coil 199 and a capacitor 198 connected to the coil 199 (secondary coil).

The inductance of the coil 194 is set to an inductance Lt, and the capacitance of the capacitor 195 is set to a capacitance C1. The inductance of the coil 199 is set to an inductance Lr, and the capacitance of the capacitor 198 is set to a capacitance C2. When the parameters are set in this way, the natural frequency f1 of the power transmitting unit 193 is expressed by the following mathematical expression (1), and the natural frequency f2 of the power receiving unit 196 is expressed by the following mathematical expression (2).

$$f1 = 1/\{2\pi(Lt \times C1)^{1/2}\} \quad (1)$$

$$f2 = 1/\{2\pi(Lr \times C2)^{1/2}\} \quad (2)$$

Figure 21:
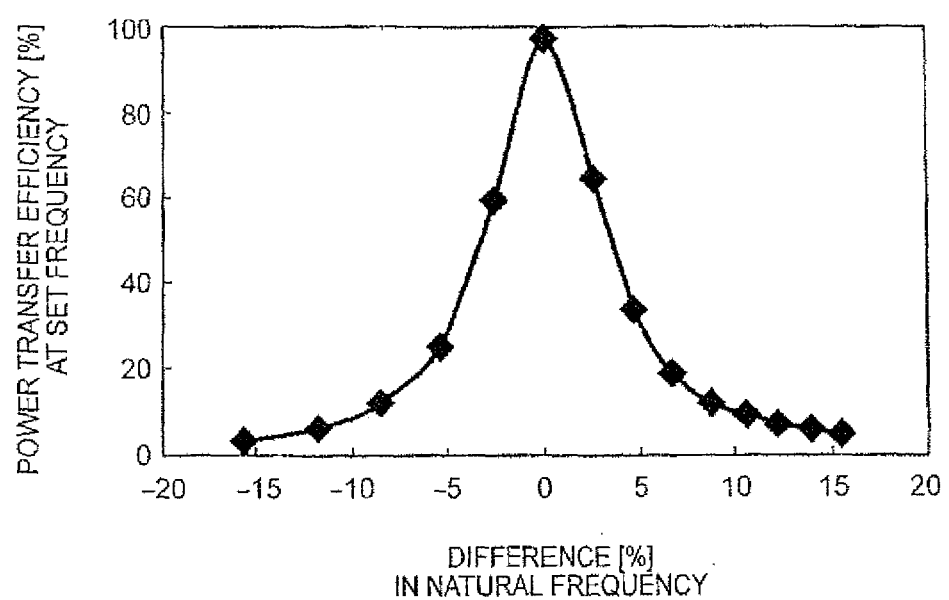
FIG. 21 is a graph that shows simulation results of the power transfer system.

Here, in the case where the inductance Lr and the capacitances C1 and C2 are fixed and only the inductance Lt is varied, the correlation between a difference in natural frequency between the power transmitting unit 193 and the power receiving unit 196 and a power transfer efficiency is shown in FIG. 21. In this simulation, a relative positional relationship between the coil 194 and the coil 199 is fixed, and, furthermore, the frequency of current that is supplied to the power transmitting unit 193 is constant.

As shown in FIG. 21, the abscissa axis represents a difference (%) in natural frequency, and the ordinate axis represents a power transfer efficiency (%) at a set frequency. The difference (%) in natural frequency is expressed by the following mathematical expression (3).

$$\text{(Difference in Natural Frequency)} = \{(f1-f2)/f2\} \times 100 \quad (\%) \quad (3)$$

As is apparent from FIG. 21, when the difference (%) in natural frequency is ±0%, the power transfer efficiency is close to 100%. When the difference (%) in natural frequency is ±5%, the power transfer efficiency is 40%. When the difference (%) in natural frequency is ±10%, the power transfer efficiency is 10%. When the difference (%) in natural frequency is ±15%, the power transfer efficiency is 5%. That is, it is found that, by setting the natural frequency of each of the power transmitting unit and power receiving unit such that the absolute value of the difference (%) in natural frequency (difference in natural frequency) falls at or below 10% of the natural frequency of the power receiving unit 196, it is possible to increase the power transfer efficiency. Furthermore, by setting the natural frequency of each of the power transmitting unit and the power receiving unit such that the absolute value of the difference (%) in natural frequency is smaller than or equal to 5% of the natural frequency of the power receiving unit 196, it is possible to further increase the power transfer efficiency.

Next, the operation of each of the power transfer systems according to the first to third embodiments will be described. In FIG. 1, alternating-current power is supplied from the power supply unit 42 to the primary coil that is selected and serially connected to the power supply unit 42. At this time, electric power is supplied such that the frequency of alternating current flowing through the primary coil becomes a predetermined frequency.

When current having the predetermined frequency flows through the primary coil, an electromagnetic field that oscillates at the predetermined frequency is formed around the primary coil.

The secondary coil 20 is arranged within a predetermined range from the primary coil, and the secondary coil 20 receives electric power from the electromagnetic field formed around the primary coil.

In the present embodiments, a so-called helical coil is employed as each of the secondary coil 20 and the primary coils. Therefore, a magnetic field and an electric field that oscillate at the predetermined frequency are formed around the primary coil, and the secondary coil 20 receives electric power mainly from the electric field.

Here, the magnetic field having the predetermined frequency, formed around the primary coil, will be described. The "magnetic field having the predetermined frequency" typically correlates with the power transfer efficiency and the frequency of current supplied to the primary coil. Then, first, the correlation between the power transfer efficiency and the frequency of current supplied to the primary coil will be described. The power transfer efficiency at the time when electric power is transferred from the primary coil to the secondary coil 20 varies depending on various factors, such as the distance between the primary coil and the secondary coil 20. For example, the natural frequency (resonance frequency) of each of the power transmitting unit and the power receiving unit 12 is set to f0, the frequency of current supplied to the primary coil is f3, and the air gap between the secondary coil 20 and the primary coil is set to AG.

Figure 22:
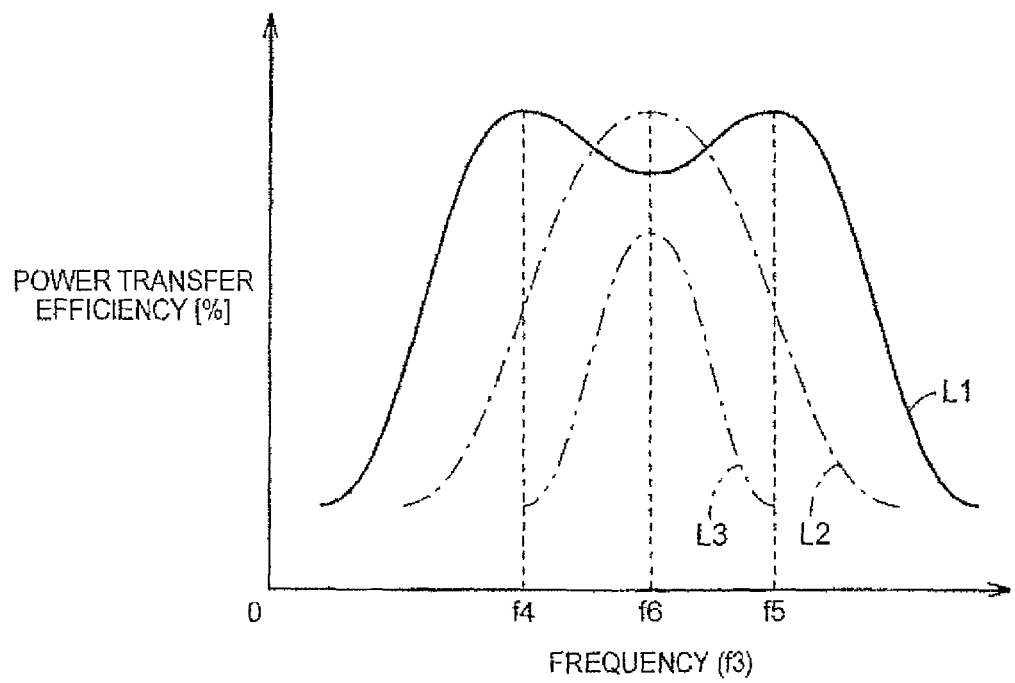
FIG. 22 is a graph that shows the correlation between a power transfer efficiency and the frequency of current supplied to a primary coil at the time when an air gap is changed in a state where a natural frequency is fixed.

FIG. 22 is a graph that shows the correlation between a power transfer efficiency and the frequency f3 of current supplied to the primary coil at the time when the air gap AG is varied in a state where the natural frequency f0 is fixed.

In the graph shown in FIG. 22, the abscissa axis represents the frequency f3 of current supplied to the primary coil, and the ordinate axis represents a power transfer efficiency (%). An efficiency curve L1 schematically shows the correlation between a power transfer efficiency and the frequency f3 of current supplied to the primary coil when the air gap AG is small. As indicated by the efficiency curve L1, when the air gap AG is small, the peak of the power transfer efficiency appears at frequencies f4 and f5 (f4<f5). When the air gap AG is increased, two peaks at which the power transfer efficiency is high vary so as to approach each other. Then, as indicated by an efficiency curve L2, when the air gap AG is increased to be longer than a predetermined distance, the number of the peaks of the power transfer efficiency is one, and the power transfer efficiency becomes a peak when the frequency of current supplied to the primary coil is f6. When the air gap AG is further increased from the state of the efficiency curve L2, the peak of the power transfer efficiency reduces as indicated by an efficiency curve L3.

For example, the following first method is conceivable as a method of improving the power transfer efficiency. In the first method, by varying the capacitances of the capacitors 52, 54, 56, 58 and the capacitance of the capacitor 21 in accordance with the air gap AG while the frequency of current supplied to the primary coil shown in FIG. 1 is constant, the characteristic of the power transfer efficiency between the power transmitting unit and the power receiving unit 12 is varied. Specifically, the capacitances of the capacitors 52, 54, 56, 58 and the capacitance of the capacitor 21 are adjusted such that the power transfer efficiency becomes a peak in a state where the frequency of current supplied to the primary coil is constant. In this method, irrespective of the size of the air gap AG, the frequency of current flowing through the primary coil and the secondary coil 20 is constant. As a method of varying the characteristic of the power transfer efficiency, a method of utilizing a matching transformer provided between the power transmitting device 40 and the power supply unit 42, a method of utilizing a power receiving-side converter, or the like, may be employed.

In addition, in the second method, the frequency of current supplied to the primary coil is adjusted on the basis of the size of the air gap AG. For example, in FIG. 22, when the power transfer characteristic becomes the efficiency curve L1, current having the frequency f4 or the frequency f5 is supplied to the primary coil. Then, when the frequency characteristic becomes the efficiency curve L2 or L3, current having the frequency f6 is supplied to the primary coil. In this case, the frequency of current flowing through the primary coil and the secondary coil is varied in accordance with the size of the air gap AG.

In the first method, the frequency of current flowing through the primary coil is a fixed constant frequency, and, in the second method, the frequency of current flowing through the primary coil is a frequency that appropriately varies with the air gap AG. Through the first method, the second method, or the like, current having the predetermined frequency set such that the power transfer efficiency is high is supplied to the primary coil. When current having the predetermined frequency flows through the primary coil, a magnetic field (electromagnetic field) that oscillates at the predetermined frequency is formed around the primary coil. The power receiving unit 12 receives electric power from the power transmitting unit through a magnetic field that is formed between the power receiving unit 12 and the power transmitting unit and that oscillates at the predetermined frequency. Thus, the "magnetic field that oscillates at the predetermined frequency" is not necessarily a magnetic field having a fixed frequency. In the above-described embodiments, the frequency of current supplied to the primary coil is set by focusing on the air gap AG; however, the power transfer efficiency also varies on the basis of other factors, such as a deviation in the horizontal position between the primary coil and the secondary coil 20, so the frequency of current supplied to the primary coil may possibly be adjusted on the basis of those other factors.

The description is made on the example in which a helical coil is employed as each resonance coil; however, when, for example, an antenna, such as a meander line, is employed as each resonance coil, current having the predetermined frequency flows through the primary coil, and, therefore, an electric field having the predetermined frequency is formed around the primary coil. Then, through the electric field, electric power is transferred between the power transmitting unit and the power receiving unit 12.

Figure 23:
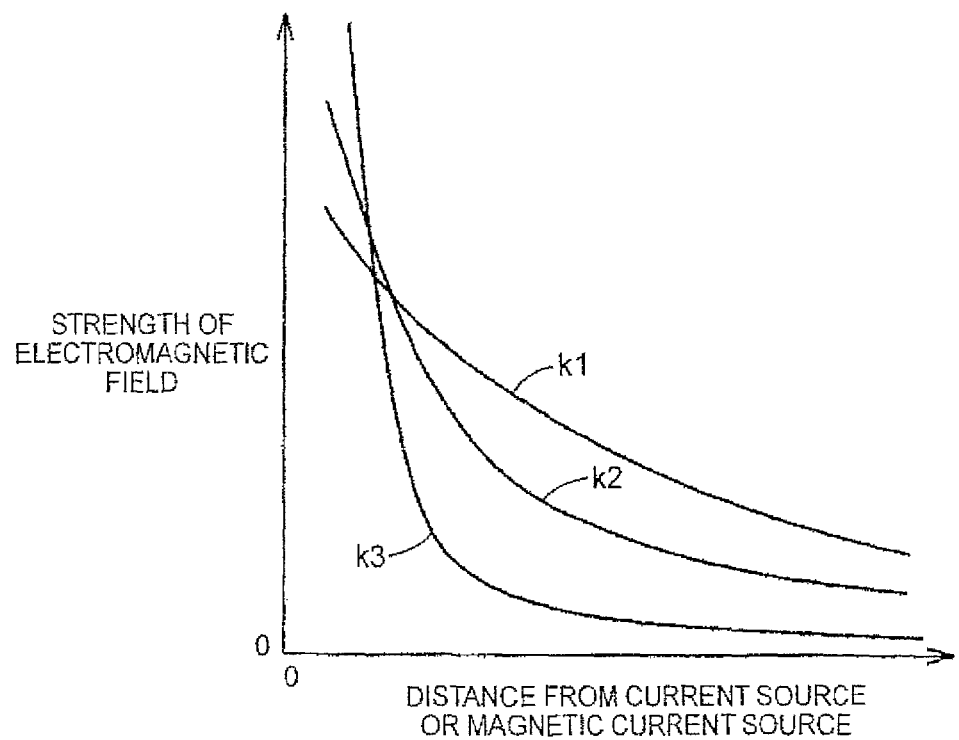
FIG. 23 is a graph that shows the correlation between a distance from a current source or a magnetic current source and the strength of an electromagnetic field.

In each of the power transfer systems according to the present embodiments, a near field (evanescent field) in which the static electromagnetic field of an electromagnetic field is dominant is utilized. Thus, power transmitting and power receiving efficiencies are improved. FIG. 23 is a graph that shows the correlation between a distance from a current source or a magnetic current source and the strength of an electromagnetic field. As shown in FIG. 23, the electromagnetic field consists of three components. The curve k1 is a component that is inversely proportional to the distance from a wave source, and is called radiation electromagnetic field. The curve k2 is a component that is inversely proportional to the square of the distance from the wave source, and is called induction electromagnetic field. In addition, the curve k3 is a component that is inversely proportional to the cube of the distance from the wave source, and is called static electromagnetic field. Where the wavelength of the electromagnetic field is λ, a distance at which the strengths of the radiation electromagnetic field, induction electromagnetic field and static electromagnetic field are substantially equal to one another may be expressed as $\lambda/2\pi$.

The static electromagnetic field is a region in which the strength of electromagnetic field steeply reduces with a distance from a wave source, and, in each of the power transfer systems according to the present embodiments, a near field (evanescent field) in which the static electromagnetic field is dominant is utilized to transfer energy (electric power). That is, by resonating the power transmitting unit and the power receiving unit 12 (for example, a pair of LC resonance coils) having the close natural frequencies in the near field in which the static electromagnetic field is dominant, energy (electric power) is transferred from the power transmitting unit to the other power receiving unit 12. The static electromagnetic field does not propagate energy over long distance, so the resonance method is able to transmit electric power with less loss of energy in comparison with an electromagnetic wave that transmits energy (electric power) through the radiation electromagnetic field that propagates energy over a long distance.

In this way, in each of the power transfer systems, by resonating the power transmitting unit and the power receiving unit through the electromagnetic field, electric power is contactlessly transferred between the power transmitting unit and the power receiving unit. Such an electromagnetic field that is formed between the power receiving unit and the power transmitting unit may be, for example, called a near field resonance coupling field.

Coupling between the power transmitting unit and the power receiving unit 12 in power transfer is, for example, called magnetic resonance coupling, magnetic field resonance coupling, near field resonance coupling, electromagnetic field resonance coupling or electric field resonance coupling.

The electromagnetic field resonance coupling means coupling that includes the magnetic resonance coupling, the magnetic field resonance coupling and the electric field resonance coupling.

Coil-shaped antennas are employed as the primary coil of each power transmitting unit and the secondary coil 20 of the power receiving unit 12, so the power transmitting unit and the power receiving unit 12 are mainly coupled through a magnetic field, and the power transmitting unit and the power receiving unit 12 are coupled through magnetic resonance coupling or magnetic field resonance coupling.

For example, an antenna, such as a meander line, may be employed as each of the primary coils and the secondary coil 20. In this case, the power transmitting unit and the power receiving unit 12 are coupled to each other mainly through an electric field. At this time, the power transmitting unit and the power receiving unit 12 are coupled through electric field resonance coupling. In this way, in the present embodiments, electric power is contactlessly transferred between the power receiving unit 12 and the power transmitting unit. In this way, at the time of contactlessly transferring electric power, a magnetic field is mainly formed between the power receiving unit 12 and the power transmitting unit.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A power transmitting device that contactlessly transmits electric power to a secondary coil provided at a vehicle, the power transmitting device comprising:
   a plurality of primary coils located separate from the vehicle and arranged at an interval in an arrangement direction;
   a selecting unit configured to select one of the primary coils, to which electric power is to be supplied from a power supply; and
   a control unit configured to control the selecting unit, the control unit being configured to cause the power supply to supply the selected primary coil with a second electric power smaller than a first electric power, the control unit being configured to select a power transmitting coil from among the plurality of primary coils based on at least one of a power transmitting situation of the selected primary coil and a power receiving situation of the secondary coil, the control unit being configured to cause the power supply to supply the power transmitting coil with the first electric power.

2. The power transmitting device according to claim 1, wherein
   the control unit is configured to detect an approach direction of the vehicle,
   the control unit is configured to start control for selecting the power transmitting coil before the secondary coil passes over one of the plurality of primary coils, which is located at an upstream end in the approach direction,
   the control unit is configured to select the one of the plurality of primary coils, which is located at the upstream end in the approach direction, at the time when control for selecting the power transmitting coil is started, and
   the control unit is configured to change a selecting one of the primary coils with movement of the secondary coil.

3. The power transmitting device according to claim 2, wherein
   the control unit is configured to detect the approach direction of the vehicle on the basis of information received from the vehicle.

4. The power transmitting device according to claim 2, wherein
the plurality of primary coils include a first end coil and a second end coil, the first end coil being located at one end in the arrangement direction, and the second end coil being located at the other end in the arrangement direction, and
the control unit is configured to alternately select the first end coil and the second end coil, the control unit being configured to detect the approach direction of the vehicle on the basis of a result of comparison between a power receiving efficiency of the secondary coil from the first end coil and a power receiving efficiency of the secondary coil from the second end coil.

5. The power transmitting device according to claim 2, wherein
the power receiving situation is a power receiving efficiency of the secondary coil, and
the control unit is configured to select one of the primary coils, which is adjacent in the approach direction with respect to the selected primary coil, when the power receiving efficiency of the secondary coil from the selected primary coil becomes lower than a first threshold.

6. The power transmitting device according to claim 1, wherein
the plurality of primary coils include a center coil located at a center in the arrangement direction,
the control unit is configured to select the center coil at the time when control for selecting the power transmitting coil is started, and
the control unit is configured to select one of the primary coils on the basis of a position of the secondary coil after the center coil has been selected.

7. The power transmitting device according to claim 6, wherein
the control unit is configured to set a selecting direction from the center coil toward the secondary coil on the basis of information input from the vehicle,
the control unit is configured to detect a first power receiving efficiency at the time when the second electric power is supplied to the selected primary coil,
the control unit is configured to detect a second power receiving efficiency at the time when the second electric power is supplied to an adjacent coil adjacent in the selecting direction with respect to the selected primary coil, and
the control unit is configured to set the selected primary coil as the power transmitting coil when the first power receiving efficiency is higher than the second power receiving efficiency and the first power receiving efficiency is higher than a second threshold.

8. The power transmitting device according to claim 1, wherein
the control unit is configured to, when the control unit determines that a power transmitting condition is not satisfied after the first electric power is supplied to the power transmitting coil, stop supply of electric power to the power transmitting coil and select one of the primary coils other than the power transmitting coil as a power transmitting coil.

9. The power transmitting device according to claim 8, further comprising:
a temperature measuring unit configured to detect a temperature of each of the primary coils, wherein
the control unit is configured to determine that the power transmitting condition is not satisfied when the temperature of the power transmitting coil exceeds a third threshold.

10. The power transmitting device according to claim 9, wherein
the control unit is configured to supply the second electric power to one of the primary coils, adjacent in the arrangement direction with respect to the power transmitting coil, and
the control unit is configured to, when a power receiving efficiency of the secondary coil at the time when the second electric power is supplied to the one of the primary coils, adjacent in the arrangement direction, is higher than a fourth threshold, select the adjacent primary coil as the power transmitting coil.

11. The power transmitting device according to claim 8, further comprising:
a detecting unit configured to detect a distance between the selected primary coil and the secondary coil, wherein
the control unit is configured to determine that the power transmitting condition is not satisfied when the control unit determines that the distance between the selected primary coil and the secondary coil is larger or smaller than a predetermined range on the basis of an output from the detecting unit.

12. The power transmitting device according to claim 11, wherein
the control unit is configured to, when a power receiving efficiency of the secondary coil from one of the primary coils, adjacent with respect to the selected primary coil, is higher than or equal to a predetermined value, select the one of the primary coils, adjacent with respect to the selected primary coil, as a second selected coil.

13. A power transfer system including a power receiving device that has a secondary coil provided at a vehicle and a power transmitting device that contactlessly transmits electric power to the secondary coil, the power transmitting device comprising:
a plurality of primary coils located separate from the vehicle and arranged at an interval in an arrangement direction;
a selecting unit configured to select one of the primary coils, to which electric power is to be supplied from a power supply; and
a control unit configured to control the selecting unit, the control unit being configured to cause the power supply to supply the selected primary coil with a second electric power smaller than a first electric power, the control unit being configured to select a power transmitting coil from among the plurality of primary coils based on the basis of at least one of a power transmitting situation of the selected primary coil and a power receiving situation of the secondary coil, the control unit being configured to cause the power supply to supply the power transmitting coil with the first electric power.

* * * * *